United States Patent
Bito et al.

(10) Patent No.: US 11,943,277 B2
(45) Date of Patent: Mar. 26, 2024

(54) CONVERSION SYSTEM, METHOD AND PROGRAM

(71) Applicant: Geek Guild Co., Ltd., Kyoto (JP)

(72) Inventors: Miki Bito, Kyoto (JP); Shinsuke Hanamura, Kyoto (JP)

(73) Assignee: Geek Guild Co., Ltd., Kyoto (JP)

( * ) Notice: Subject to any disclaimer, the term of this patent is extended or adjusted under 35 U.S.C. 154(b) by 537 days.

(21) Appl. No.: 17/261,346

(22) PCT Filed: Mar. 12, 2020

(86) PCT No.: PCT/JP2020/010806
§ 371 (c)(1),
(2) Date: Jan. 19, 2021

(87) PCT Pub. No.: WO2020/189496
PCT Pub. Date: Sep. 24, 2020

(65) Prior Publication Data
US 2021/0266383 A1    Aug. 26, 2021

(30) Foreign Application Priority Data

Mar. 15, 2019  (JP) ................................ 2019-049137
Mar. 15, 2019  (JP) ................................ 2019-049138

(51) Int. Cl.
*H04L 67/01*     (2022.01)
*G06N 20/00*    (2019.01)
(Continued)

(52) U.S. Cl.
CPC ............. *H04L 67/01* (2022.05); *G06N 20/00* (2019.01); *H04L 63/0428* (2013.01); *H04L 67/568* (2022.05)

(58) Field of Classification Search
CPC ... H04L 67/01; H04L 63/0428; H04L 67/568; H04L 63/0442; G06N 20/00; G06N 3/045; G06N 3/084; G06F 21/602
See application file for complete search history.

(56) References Cited

U.S. PATENT DOCUMENTS

2017/0028499 A1    2/2017  Yoshida et al.
2017/0161603 A1    6/2017  Okanohara et al.
(Continued)

FOREIGN PATENT DOCUMENTS

JP     5816771 B1      11/2015
JP     2017-30014 A     2/2017
(Continued)

OTHER PUBLICATIONS

Jinliang Wei et al.: "Efficient and Programmable Distributed Shared Memory Systems for Machine Learning Training Thesis Committee", (Jan. 1, 2018), XP055586024, (pp. 1-73) Retrieved from the Internet: URL:https://pdfs.semanticscholar.org/230a/3ba2e031b841723ad15c0987deb3b88c17af.pdf.
(Continued)

*Primary Examiner* — Bruce S Ashley
(74) *Attorney, Agent, or Firm* — Millen, White, Zelano & Branigan, P.C.; Ryan R. Pool

(57) ABSTRACT

[Problem to be Solved]
To provide a secure system capable of satisfying the requirements of both users and providers of machine learning technology.
[Solution]
Provided is a conversion system in which a client device includes: an input-side conversion processing unit that is a part of the trained model extending from an input layer to a first middle layer of the trained model, and performs conversion processing based on the input data to generate a first intermediate output of the first middle layer of the trained
(Continued)

model; a client-side transmitting unit that transmits the first intermediate output to a server; a client-side receiving unit that receives a second intermediate output from the server, the second intermediate output being generated in the server based on the first intermediate output and being a conversion output of the second middle layer closer to the output side than the first middle layer of the trained model; and an output-side conversion processing unit that is a part of the trained model extending from the second middle layer to an output layer of the trained model, and performs conversion processing based on the second intermediate output to generate the output data.

15 Claims, 30 Drawing Sheets

(51) Int. Cl.
  H04L 9/40 (2022.01)
  H04L 67/568 (2022.01)

(56) References Cited

U.S. PATENT DOCUMENTS

| | | | |
|---|---|---|---|
| 2018/0144244 A1* | 5/2018 | Masoud | G06N 3/105 |
| 2018/0165571 A1 | 6/2018 | Tanabe | |
| 2018/0336463 A1 | 11/2018 | Bloom | |
| 2019/0042878 A1 | 2/2019 | Sheller et al. | |
| 2019/0109926 A1* | 4/2019 | Hotchkies | H04L 67/01 |
| 2019/0347556 A1* | 11/2019 | Yim | G06F 18/22 |
| 2023/0084653 A1 | 3/2023 | Frandzel et al. | |

FOREIGN PATENT DOCUMENTS

| | | |
|---|---|---|
| JP | 2018-97612 A | 6/2018 |
| JP | 2018-163623 A | 10/2018 |
| WO | 2018218259 A1 | 11/2018 |

OTHER PUBLICATIONS

Chengjie Qin et al: "Scalable asynchronous gradient descent optimization for out-of-core models", Proceedings of the VLDB Endowment; [ACM Digital Library], Assoc. of Computing Machinery, New York, NY, vol. 10, No. 10, Jun. 1, 2017 (Jun. 1, 2017), pp. 986-997, XP058372442, ISSN: 2150-8097.

Search report in corresponding EP 20774533 dated Feb. 22, 2023 (pp. 1-9).

International Search Report dated Jun. 9, 2020 issued in corresponding PCT/JP2020/010806 application (2 pages).

English Translation of JP 2018-163623 A published Oct. 18, 2018.

* cited by examiner

CONVERSION SYSTEM, METHOD AND PROGRAM

TECHNICAL FIELD

The present invention relates to a conversion system, a method, a program, and the like using machine learning technology.

BACKGROUND ART

In recent years, artificial intelligence (AI), particularly machine learning technology, has been attracting attention, and the application of machine learning technology to various uses and problem solutions has been attempted. For instance, applying machine learning technology to industrial robots installed in factories and the like and achieving more appropriate control is attempted by manufacturers, production line automating businesses, and the like (see Patent Literature 1, for example).

CITATION LIST

Patent Literature

Patent Literature 1: Japanese Patent Laid-Open No. 2017-030014

SUMMARY OF INVENTION

Technical Problem

Incidentally, it is still difficult to say that machine learning technology is in widespread use. Therefore, in many cases where machine learning technology should be applied to a specific target, it is performed in a manner in which a business entity that has specialized knowledge about machine learning technology, for example, provides machine learning technology to users who do not have knowledge about machine learning technology but have specific problems.

However, at this time, the provider of the machine learning technology is generally cautious about providing a computer program, or the like, related to machine learning to the users. This is because there are risks such as unintended diversion, outflow, and reverse engineering of the program.

On the other hand, users of machine learning technology are cautious about providing various data that they possess, particularly raw data, to be used for machine learning to third parties including machine learning technology providers. This is because such data often corresponds to personal information, trade secrets, or the like, and is information that requires extremely delicate handling.

This means that, in the past, promotion of the use of machine learning technology has not sufficiently been made due to the respective circumstances of users and providers of machine learning technology.

An object of the present invention, which has been made under the above-mentioned technical background, is to provide a secure system capable of satisfying the requirements of both users and providers of machine learning technology.

Still, other objects and advantageous effects of the present invention should be readily understood by those skilled in the art by reference to the following description.

Solution to Problem

The aforementioned technical problem can be solved by conversion systems, and the like, having the following configurations.

In particular, a conversion system according to the present invention is connected with a client device and a server via the client device and a network, and generates output data by performing conversion processing on input data based on a trained model obtained by machine learning, the client device including: an input-side conversion processing unit that is a part of the trained model extending from an input layer to a first middle layer of the trained model, and performs conversion processing based on the input data to generate a first intermediate output of the first middle layer of the trained model; a client-side transmitting unit that transmits the first intermediate output to the server; a client-side receiving unit that receives a second intermediate output from the server, the second intermediate output being generated in the server from the first intermediate output and being a conversion output of the second middle layer closer to the output side than the first middle layer of the trained model; and an output-side conversion processing unit that is a part of the trained model extending from the second middle layer to an output layer of the trained model, and performs conversion processing based on the second intermediate output to generate the output data.

With such a configuration, conversion processing using machine learning does not allow raw data to be communicated, but only the abstracted intermediate output is transmitted and received between the client device and the server. Therefore, the user of the client device can ensure the protection of information such as personal information and trade secrets. Besides, the provider of trained models does not need to provide the entire trained model to the client device side. Therefore, it is possible to reduce the risk of leakage, and the like, of the algorithm or the program implementing the algorithm. In other words, it is possible to provide a secure conversion system capable of satisfying the requirements of both the user side and the provider side of the trained model.

Here, both the terms "the first intermediate output" and "the second intermediate output" are not only mere output values of each of the layers of a trained model, but also include values for which prescribed conversion such as encrypting the output values has been performed.

The client device may further include: a cache table storage unit that stores a cache table showing correspondence between the first intermediate output and the second intermediate output; a determination unit that determines whether or not the second intermediate output corresponding to the first intermediate output exists in the cache table; and a selective acquisition unit that, when the determination unit determines that the second intermediate output corresponding to the first intermediate output exists in the cache table, acquires the corresponding second intermediate output from the cache table instead of operating the client-side transmitting unit and the client-side receiving unit, and when the determination unit determines that the second intermediate output corresponding to the first intermediate output is absent from the cache table, operates the client-side transmitting unit and the client-side receiving unit to acquire the second intermediate output received at the client-side receiving unit.

The client device may further include a cache table storage unit that associates the second intermediate output received at the client-side receiving unit with the corresponding first intermediate output, and stores the second intermediate output to the cache table.

The client device may further include: an encryption unit that encrypts the first intermediate output and generates a first encrypted intermediate output; and a decryption unit that decrypts a second encrypted intermediate output that is a second intermediate output encrypted in the server, and the client-side transmitting unit may transmit the first encrypted intermediate output to the server, the server may decrypt the received first encrypted intermediate output to restore the first intermediate output, encrypt the second intermediate output to generate the second encrypted intermediate output, and transmit the second encrypted intermediate output to the client device, and the client-side receiving unit may receive the second encrypted intermediate output.

The client device may further include a hashing processing unit that hashes the first encrypted intermediate output and generates a first hash value, the first intermediate output in the cache table may be the first hash value, and the determination unit may determine whether or not the corresponding second intermediate output exists, based on the first hash value.

The client device may further include a value rounding processing unit that performs rounding processing of the first intermediate output to generate a first rounded intermediate output.

The client device may further include: an approximation function generating unit that generates an approximation function, based on the cache table; and an approximation conversion processing unit that generates the second intermediate output based on the approximation function that uses the first intermediate output as an input.

The approximation function may be a function to which the backpropagation method can be applied.

The approximation function may include a bypass function.

The approximation function may consist of a weighted sum of multiple different approximation functions.

The client device may include a plurality of client devices, and the cache table may be shared by the client devices.

The server may further include an intermediate conversion processing unit that is a part of the trained model extending from the first middle layer to the second middle layer, and performs conversion processing based on the first intermediate output to generate the second intermediate output of the second middle layer.

The server may include servers in multiple layers connected via a network, and each server may respectively hold a partial model divided from the trained model between the first middle layer and the second middle layer so that conversion processing is performed in sequence based on each partial model of each server to generate the second intermediate output.

The client device may further include an input and output data table storage unit that stores an input and output data table showing a relationship between the input data and the output data corresponding to the input data.

The present invention can also be conceived as a client device. In particular, the client device according to the present invention is a client device that is connected with a server via a network, and generates output data by performing conversion processing on input data based on a trained model obtained by machine learning, the client device including: an input-side conversion processing unit that is a part of the trained model extending from an input layer to a first middle layer of the trained model, and performs conversion processing based on the input data to generate a first intermediate output of the first middle layer of the trained model; a client-side transmitting unit that transmits the first intermediate output to the server; a client-side receiving unit that receives a second intermediate output from the server, the second intermediate output being generated in the server based on the first intermediate output and being a conversion output of the second middle layer closer to the output side than the first middle layer of the trained model; and an output-side conversion processing unit that is a part of the trained model extending from the second middle layer to an output layer of the trained model, and performs conversion processing based on the second intermediate output to generate the output data.

The present invention can also be conceived as a conversion method. In particular, the conversion method according to the present invention is a conversion method that is connected to a server via a network, and generates output data by performing conversion processing on input data based on a trained model obtained by machine learning, the method including: an input-side conversion processing step of using a part of the trained model extending from an input layer to a first middle layer of the trained model to perform conversion processing based on the input data to generate a first intermediate output of the first middle layer of the trained model; a client-side transmitting step of transmitting the first intermediate output to the server; a client-side receiving step of receiving a second intermediate output from the server, the second intermediate output being generated in the server based on the first intermediate output and being a conversion output of the second middle layer closer to the output side than the first middle layer of the trained model; and an output-side conversion processing step of using a part of the trained model extending from the second middle layer to an output layer of the trained model to perform conversion processing based on the second intermediate output to generate the output data.

The present invention can also be conceived as a control program. In particular, the control program according to the present invention is a control program for a client device that is connected with a server via a network, and generates output data by performing conversion processing on input data based on a trained model obtained by machine learning, the program including: an input-side conversion processing step of using a part of the trained model extending from an input layer to a first middle layer of the trained model to perform conversion processing based on the input data to generate a first intermediate output of the first middle layer of the trained model; a client-side transmitting step of transmitting the first intermediate output to the server; a client-side receiving step of receiving a second intermediate output from the server, the second intermediate output being generated in the server based on the first intermediate output and being a conversion output of the second middle layer closer to the output side than the first middle layer of the trained model; and an output-side conversion processing step that is a part of the trained model extending from the second middle layer to an output layer of the trained model to perform conversion processing based on the second intermediate output to generate the output data.

The present invention can also be conceived as a server. In particular, the server according to the present invention is a server that is connected to a client device via a network, and generates output data by performing conversion processing on input data based on a trained model obtained by machine learning, the client device including: an input-side conversion processing unit that is a part of the trained model extending from an input layer to a first middle layer of the trained model, and performs conversion processing based on the input data to generate a first intermediate output of the first middle layer of the trained model; a client-side transmitting unit that transmits the first intermediate output to the server; a client-side receiving unit that receives a second intermediate output from the server, the second intermediate output being generated in the server from the first intermediate output and being a conversion output of the second middle layer closer to the output side than the first middle layer of the trained model; and an output-side conversion processing unit that is a part of the trained model extending from the second middle layer to an output layer of the trained model, and performs conversion processing based on the second intermediate output to generate the output data.

The conversion system according to the present invention viewed from another aspect is a conversion system that generates output data by performing conversion processing on input data based on a trained model obtained by machine learning, the conversion system including: an input-side conversion processing unit that is a part of the machine learning model extending from an input layer to a first middle layer of the machine learning model, and performs conversion processing based on the input data supplied to the machine learning model to generate a first intermediate output of the first middle layer of the machine learning model; an output-side conversion processing unit that is a part of the machine learning model extending from the second middle layer closer to the output side than the first middle layer to an output layer, and performs conversion processing based on an input to the second middle layer to generate the output data of the machine learning model; and an intermediate conversion processing unit that performs conversion processing based on an approximation function generated based on sample information showing correspondence between the first intermediate output and the second intermediate output in the machine learning model, and generates the second intermediate output based on the first intermediate output, wherein the output data is generated by operating the input-side conversion processing unit, the intermediate conversion processing unit, and the output-side conversion processing unit, using the input data as an input to the input-side conversion processing unit.

With such a configuration, an approximation function can be generated based on sample information related to correspondence of the already acquired intermediate output to perform conversion processing, so that conversion processing can be performed without making inquiries to the server or the like. Such a configuration further leads to the autonomy of the conversion devices, such as client devices, or the system and shortens the conversion time. Note that such a configuration may be used in combination as appropriate with the aforementioned conversion system that makes inquiries to the server, and the conversion processing algorithm may be changed as appropriate according to, for example, the communication environment or the availability of the network.

Advantageous Effects of Invention

According to the present invention, a secure prediction system capable of satisfying the requirements of both the user side and the provider side of machine learning technology can be provided.

DESCRIPTION OF EMBODIMENTS

An embodiment of a system and the like according to the present invention will now be described in detail with reference to the accompanying drawings. In the following embodiments, the term "prediction processing" may be used. As will be apparent to those skilled in the art, the term "prediction processing" refers to forward arithmetic processing of a trained model and can, therefore, for example, be replaced with terms such as simply conversion processing or inference processing.

1. First Embodiment

<1.1 System Configuration>

First, the configuration of a system 10 of this embodiment will be described with reference to FIGS. 1 to 5.

Figure 1:
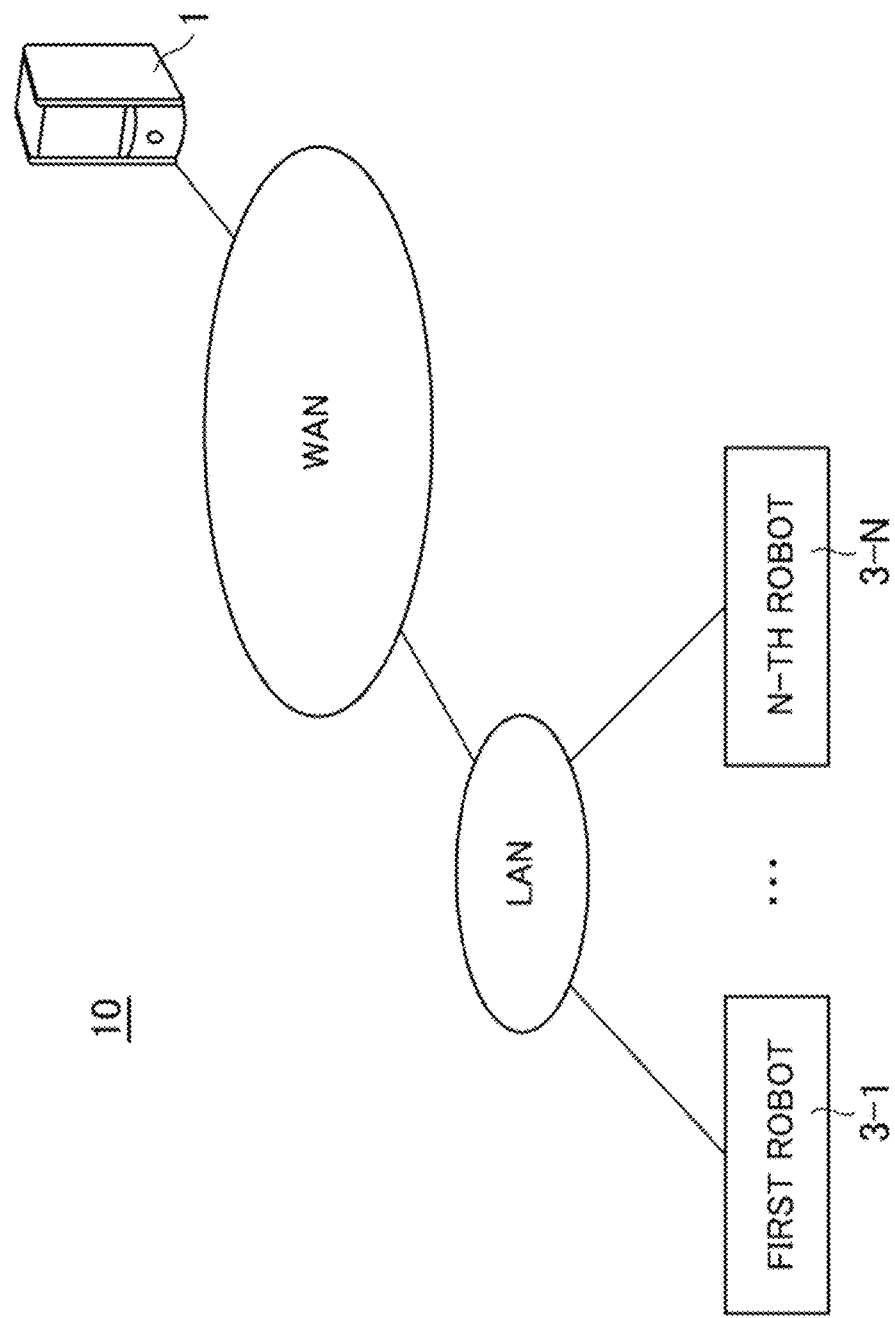
FIG. 1 is an overall configuration diagram of a system (first embodiment).

FIG. 1 is an overall configuration diagram of the system 10 according to this embodiment. As is clear from the drawing, a server 1 having a communication function and a plurality (N) of robots 3 having a communication function constitute a client-server system, and are mutually connected via a Wide Area Network (WAN) and Local Area Network (LAN). Note that the WAN is, for example, the Internet, and the LAN is installed, for example, in a factory.

Figure 2:
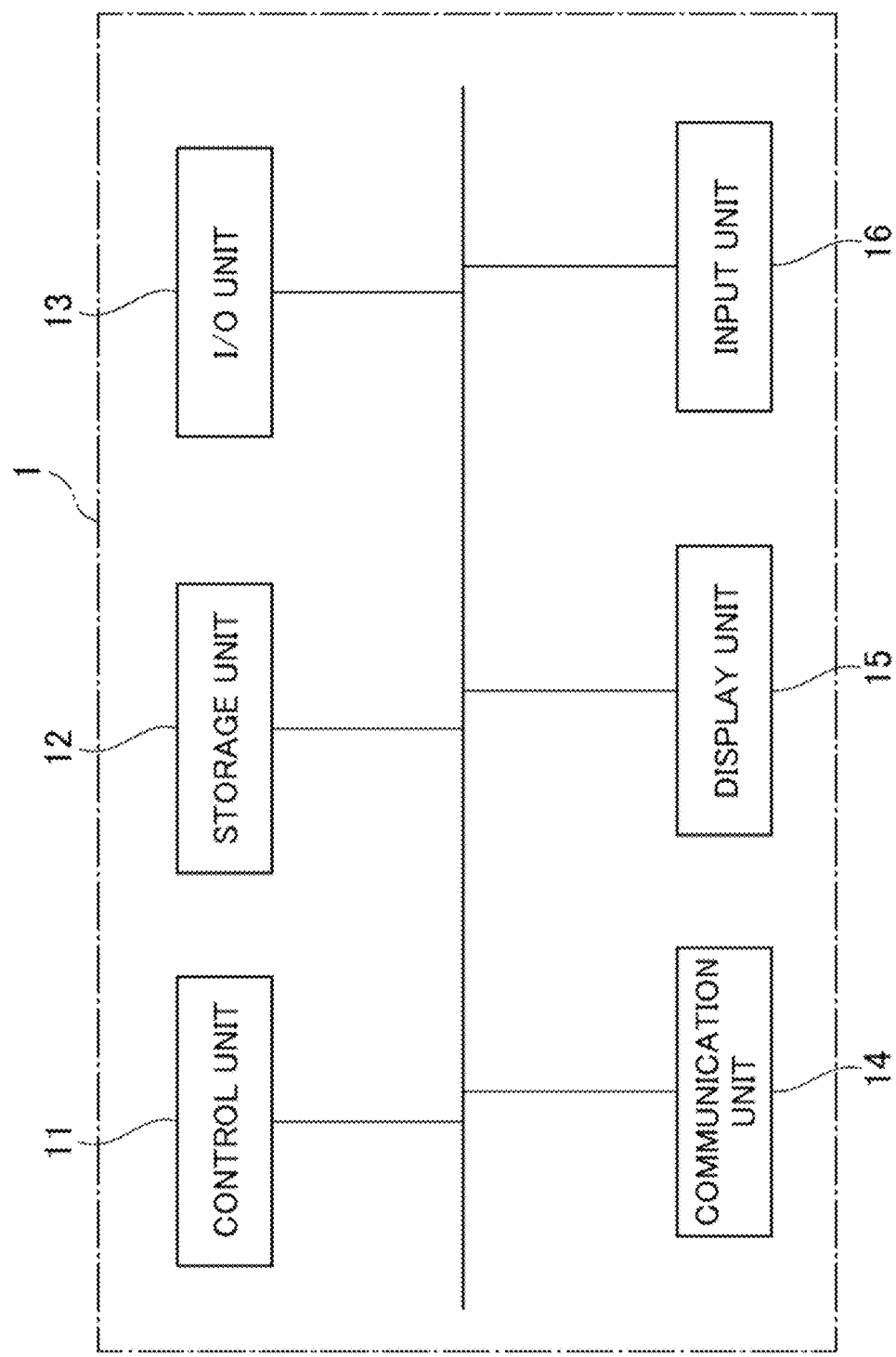
FIG. 2 is a diagram showing the hardware configuration of a server.

FIG. 2 is a diagram showing the hardware configuration of the server 1. As is clear from the drawing, the server 1 includes a control unit 11, a storage unit 12, an I/O unit 13, a communication unit 14, a display unit 15, and an input unit 16, which are connected to each other via a system bus or the like. The control unit 11 consists of a processor such as a CPU or GPU and performs execution processing for various programs. The storage unit 12 is a storage device such as a ROM, RAM, hard disk, or flash memory, and stores various data, operation programs, and the like. The I/O unit 13 performs input and output or the like with external devices. The communication unit 14 is, for example, a communication unit that communicates based on a prescribed communication standard, and communicates with the robots 3 that are client devices in this embodiment. The display unit 15 is connected to a display or the like to present a prescribed display. The input unit 16 receives input from the administrator through, for example, a keyboard or a mouse.

Figure 3:
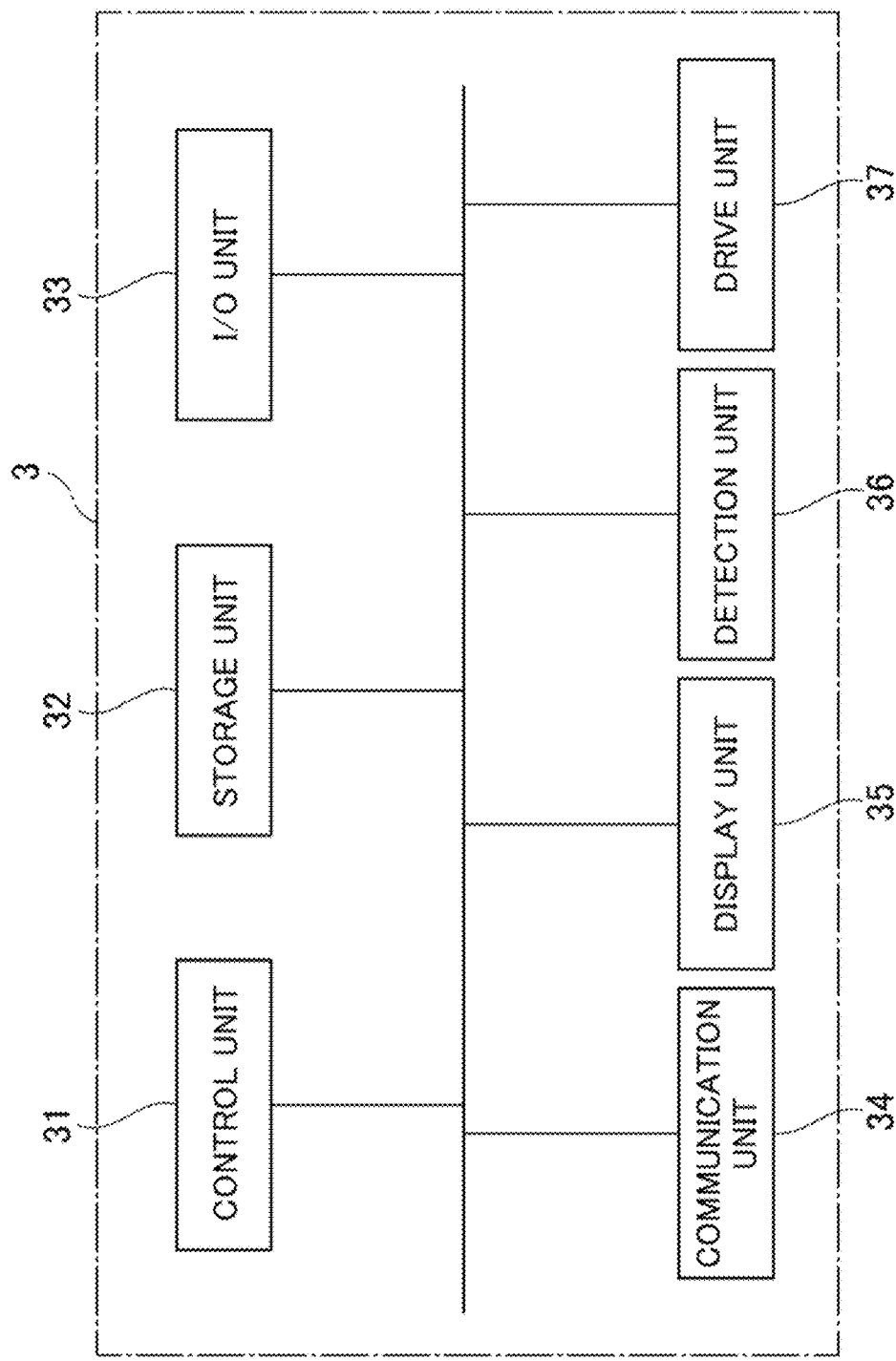
FIG. 3 is a diagram showing the hardware configuration of a robot.

FIG. 3 is a diagram showing the hardware configuration of a robot 3. The robot 3 is, for example, an industrial robot located in a factory or the like. As is clear from the drawing, the robot 3 includes a control unit 31, a storage unit 32, an I/O unit 33, a communication unit 34, a display unit 35, a detection unit 36, and a drive unit 37, which are connected to each other via a system bus or the like. The control unit 31 consists of a processor such as a CPU or GPU, and performs execution processing for various programs. The storage unit 32 is a storage device such as a ROM, RAM, hard disk, or flash memory, and stores various data, operation programs, and the like. The I/O unit 33 performs input and output or the like with external devices. The communication unit 34 is, for example, a communication unit that communicates based on a prescribed communication standard and, in this embodiment, communicates with the server 1. The display unit 35 is connected to a display or the like to present a prescribed display. The detection unit 36 is connected to a sensor and detects sensor information as digital data. The drive unit 37 drives a connected motor or the like (not shown), in response to a command from the control unit.

Figure 4:
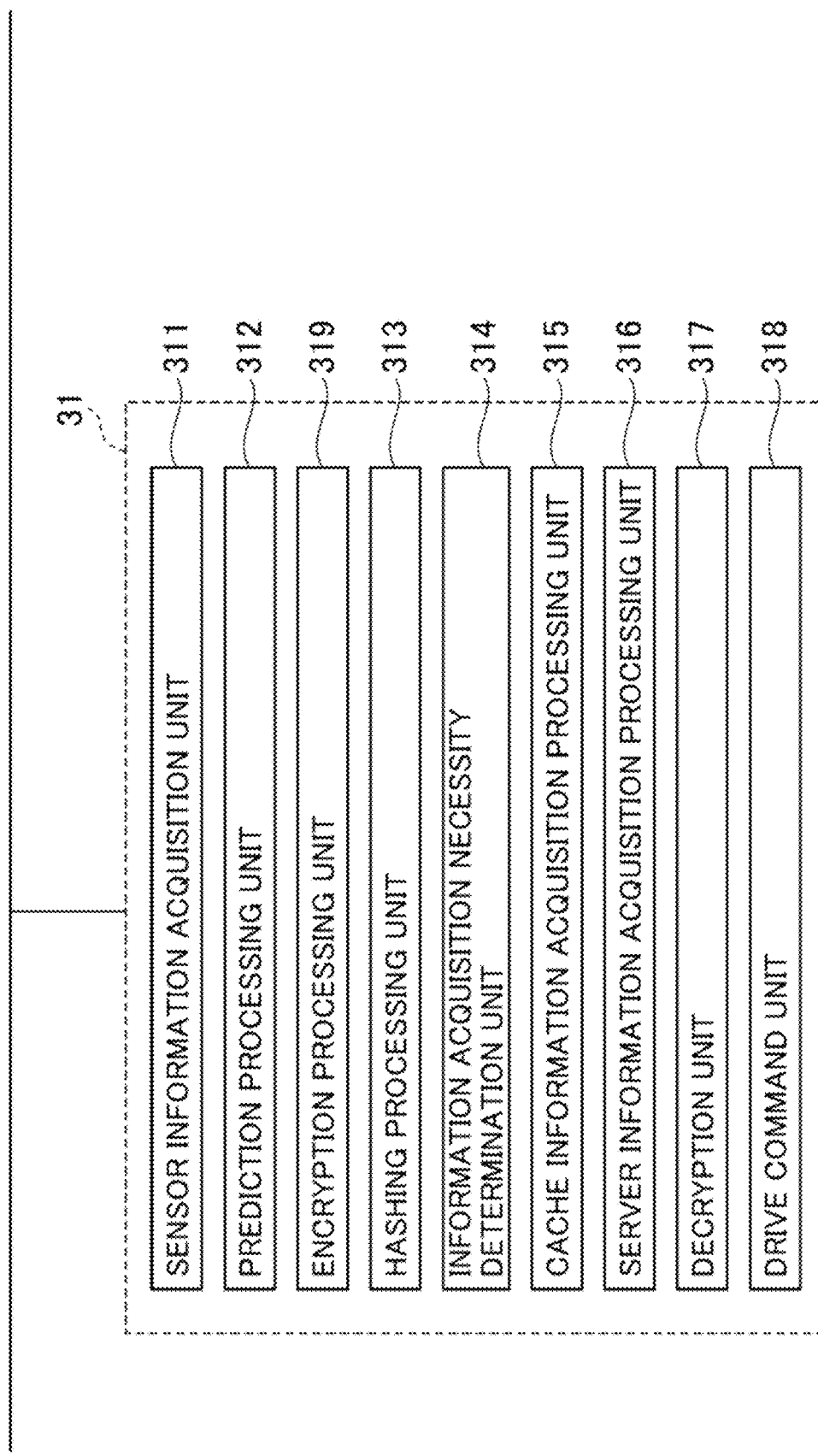
FIG. 4 is a functional block diagram related to the robot (first embodiment).

FIG. 4 is a functional block diagram of the control unit 31 of a robot 3. As is clear from the drawing, the control unit 31 includes a sensor information acquisition unit 311, a prediction processing unit 312, an encryption processing unit 319, a hashing processing unit 313, an information acquisition necessity determination unit 314, a cache information acquisition processing unit 315, a server information acquisition processing unit 316, a decryption unit 317, and a drive command unit 318.

The sensor information acquisition unit 311 acquires the sensor information acquired by the detection unit 36. The prediction processing unit 312 reads basic information, weight information, and the like on, for example, the configuration of a prediction model (trained model) generated by supervised learning of a neural network, and generates a prescribed prediction output based on the input data. The encryption processing unit 319 performs processing for encrypting the input data with a public key or the like. The hashing processing unit 313 generates corresponding hash values by hashing input information, that is, it generates irregular fixed-length values. The information acquisition necessity determination unit 314 determines whether or not the data corresponding to the prescribed data is already stored in a prescribed table. When the information acquisition necessity determination unit 314 determines that the data corresponding to the prescribed data exists, the cache information acquisition processing unit 315 acquires the corresponding data. The server information acquisition processing unit 315 transmits prescribed data to the server 1 and receives the data corresponding to that data. The decryption unit 317 performs decryption processing, with an encryption key, of the data encrypted with a public key or the like. The drive command unit 318 drives, for example, a motor according to the output data.

Figure 5:
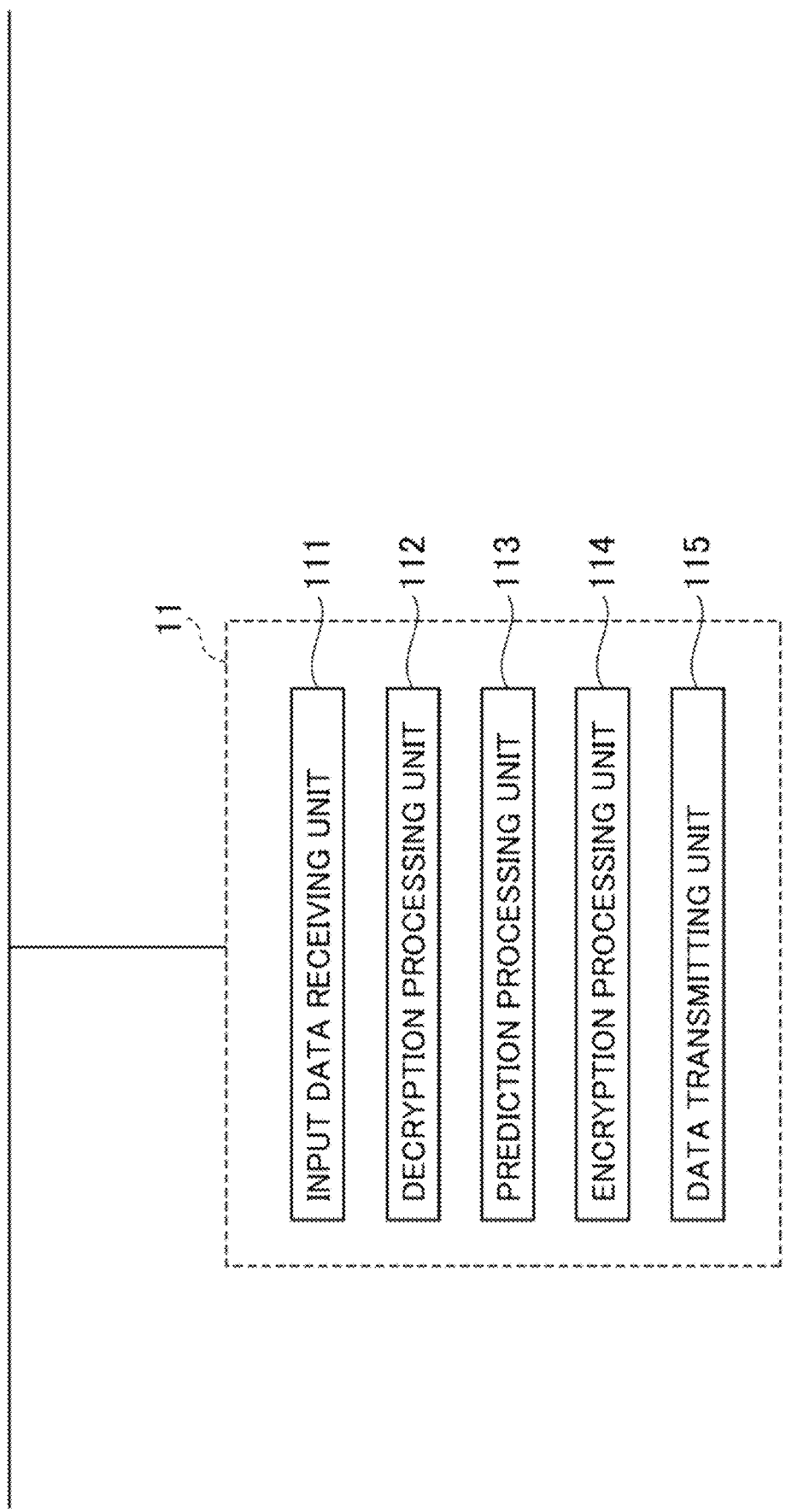
FIG. 5 is a functional block diagram related to the server (first embodiment).

FIG. 5 is a functional block diagram related to the control unit 11 of the server 1. As is clear from the drawing, the control unit 11 includes an input data receiving unit 111, a decryption processing unit 112, a prediction processing unit 113, an encryption processing unit 114, and a data transmitting unit 115.

The input data receiving unit 111 receives input data from the robots 3. The decryption processing unit 112 decrypts the data encrypted by a public key or the like with an encryption key, for example. The prediction processing unit 113 reads basic information, weight information, and the like on, for example, the configuration of a prediction model (trained model) generated by supervised learning of a neural network, and generates a prescribed prediction output based on the input data. The encryption processing unit 114 encrypts the input data with a public key or the like. The data transmitting unit performs processing of transmitting transmission-target data to the robots 3.

<1.2 System Operation>

The operation of the system 10 will now be described with reference to FIGS. 6 to 9.

The prediction processing operation in the robot 3 in this embodiment will be described with reference to FIGS. 6 and 7. In this embodiment, the robot 3 performs prescribed prediction processing based on the acquired sensor information to drive an operating unit such as a motor.

When the prediction processing is started in the robot 3, processing of acquiring sensor information (I) via the sensor information acquisition unit 311 is performed (S1). Subsequently, the sensor information (I) is input to the prediction processing unit 312 to perform prediction processing from the input stage to the first intermediate layer, thereby generating input-side intermediate layer data (X1) (S3).

The generated input-side middle layer data (X1) is encrypted by the encryption processing unit 319 with a public key, whereby encrypted input-side middle layer data (X1') is generated (S5). The encrypted input-side middle layer data (X1') is then hashed by the hashing processing unit 313 to generate a hash value (Y1) (S7).

The information acquisition necessity determination processing unit 314 then reads a hash table, and determines whether or not encrypted output-side middle layer data (Z1')

corresponding to the generated hash value (Y1) exists in the hash table (S9). The output-side middle layer data (Z1) represents, as will be explained later, the second middle layer output closer to the output layer than the first middle layer, and the encrypted output-side middle layer data (Z1') represents the output of the second middle layer that was encrypted with the public key in the server 1.

If, according to the determination (S9), the encrypted output-side middle layer data (Z1') corresponding to the hash value (Y1) exists in the hash table (S11 YES), the cache information acquisition processing unit 315 performs processing of acquiring the encrypted output-side middle layer data (Z1') as cache information (S13).

In contrast, if, according to the determination, the encrypted output-side middle layer data (Z1') corresponding to the hash value (Y1) does not exist in the hash table (S11 NO), the server information acquisition processing unit 316 transmits the encrypted input-side middle layer data (X1') to the server 1 (S15), and then goes into a prescribed waiting mode (S17 NO). Upon reception of the encrypted output-side middle layer data (Z1') from the server 1 in this waiting mode, the waiting mode is cleared (S17 YES), and processing of associating the received encrypted output-side middle layer data (Z1') with the hash value (Y1) and saving it is performed (S19). The operation of the server 1 during this period will be explained in detail in FIG. 8.

The decryption unit 317 generates the output-side middle layer data (Z1) by decrypting the acquired encrypted output-side middle layer data (Z1') with a private key (S21). After that, the prediction processing unit 312 performs prediction processing based on the generated output-side middle layer data (Z1) from the second middle layer to the output layer, thereby generating a final output (O) (S23). The drive command unit 318 then issues a drive command to a drive unit, such as a motor, based on the final output (O) (S25). Upon completion of this drive processing, sensor information acquisition processing is performed again (S1), and a series of processing (S1 to S25) is then repeated.

Figure 8:
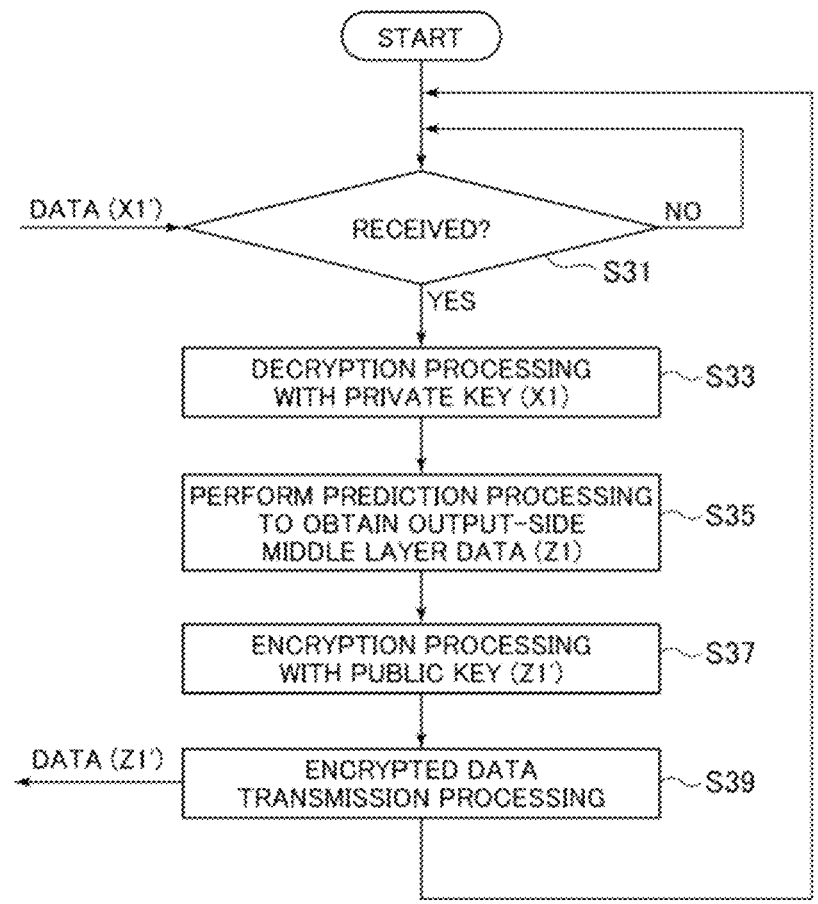
FIG. 8 is a prediction processing in the server (first embodiment).

The prediction processing operation in the server 1 will now be explained with reference to FIG. 8.

When the prediction processing is started in the server 1, the server 1 goes into a prescribed waiting mode through the input data receiving unit 111 (S31 NO). Upon reception of the encrypted input-side middle layer data (X1') from the robot 3 in this state, the waiting mode is cleared (S31 NO), and the decryption processing unit 112 performs processing to decrypt the received encrypted input-side middle layer data (X1') with the private key, thereby generating input-side middle layer data (X1) (S33). The prediction processing unit 113 then performs prediction processing from the first middle layer to the second middle layer by using the input-side middle layer data (X1) as an input, thereby generating output-side middle layer data (Z1) (S35).

The encryption processing unit 114 encrypts the output-side middle layer data (Z1) with a public key to generate the encrypted output-side middle layer data (Z1) (S37). The data transmitting unit 115 then transmits the encrypted output-side middle layer data (Z1') to the robot 3 (S39). Upon completion of this transmission processing, the server 1 returns again to the reception waiting mode (S31), and a series of processing (S31 to S39) is then repeated.

Figure 9:
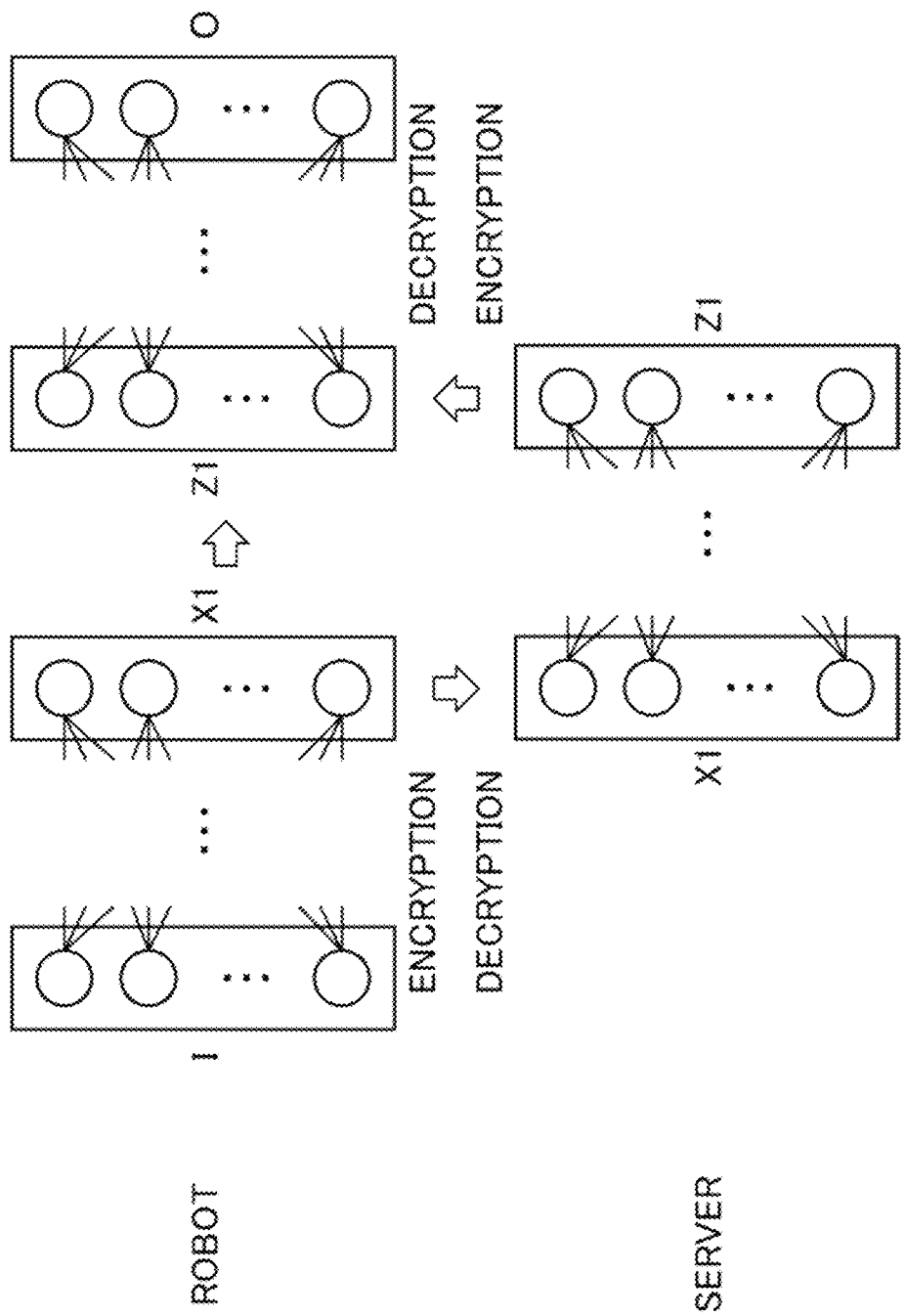
FIG. 9 is a conceptual diagram related to a prediction processing (first embodiment).

FIG. 9 is a conceptual diagram of the prediction processing implemented with the system 1 according to this embodiment. In the drawing, the upper part is a conceptual diagram of the prediction processing performed in the robot 3, and the lower part is a conceptual diagram of the prediction processing performed in the server 1. The left side of the drawing shows the input side, and the right side shows the output side.

As is clear from the drawing, when the sensor information (I) is input to the robot 3, the prediction processing unit 312 performs prediction processing from the input stage to the first middle layer, thereby generating input-side middle layer data (X1). The input-side middle layer data (X1) is then encrypted and transmitted to the server 1, and is decrypted in the server 1.

In the server 1, the prediction processing unit 113 performs prediction processing from the first middle layer to the second middle layer by using the input-side middle layer data (X1) as an input, thereby generating output-side middle layer data (Z1). The output-side middle layer data (Z1) is then encrypted and transmitted to the robot 3, and is decrypted in the robot 3.

In the robot 3, the prediction processing unit 312 performs prediction processing between the second middle layer and the output layer to generate the final output (O).

With such a configuration, in performing prediction processing using machine learning, only the abstracted intermediate output is transmitted and received between the client device (robot 3) and the server, with no need for transmitting and receiving raw data. Therefore, the user of the client device can ensure protection of information such as personal information and trade secrets. Besides, the provider of the prediction model does not need to provide the entire prediction model to the client device side. Therefore, it is possible to reduce the risk of leakage, and the like, of the algorithm or the program implementing the algorithm. In other words, it is possible to provide a secure prediction system capable of satisfying the requirements of both the user side and the provider side of the prediction model.

Besides, since an inquiry to the server for the data stored in the hash table is unnecessary, the cost of the use of the server can be reduced, and the prediction processing can be speeded up. Also, if the system is continuously used so that adequate information is accumulated in the hash table, the client device can be operated almost autonomously.

Moreover, encryption processing has been performed for intermediate outputs communicated between the client device and the server are encrypted. Therefore, this contributes to excellent data security.

In addition, hashing processing is performed in the aforementioned embodiment. This improves the data security, and by enhancing the speed of search processing in the hash table, enhancement of the speed of determination processing can be implemented.

2. Second Embodiment

In this embodiment, servers are arranged in multiple stages in a system 20.

<2.1 System Configuration>

The configuration of the system 20 according to this embodiment will be described with reference to FIGS. 10 to 12. In this embodiment, servers 5 and 6 are configured in multiple stages.

Figure 10:
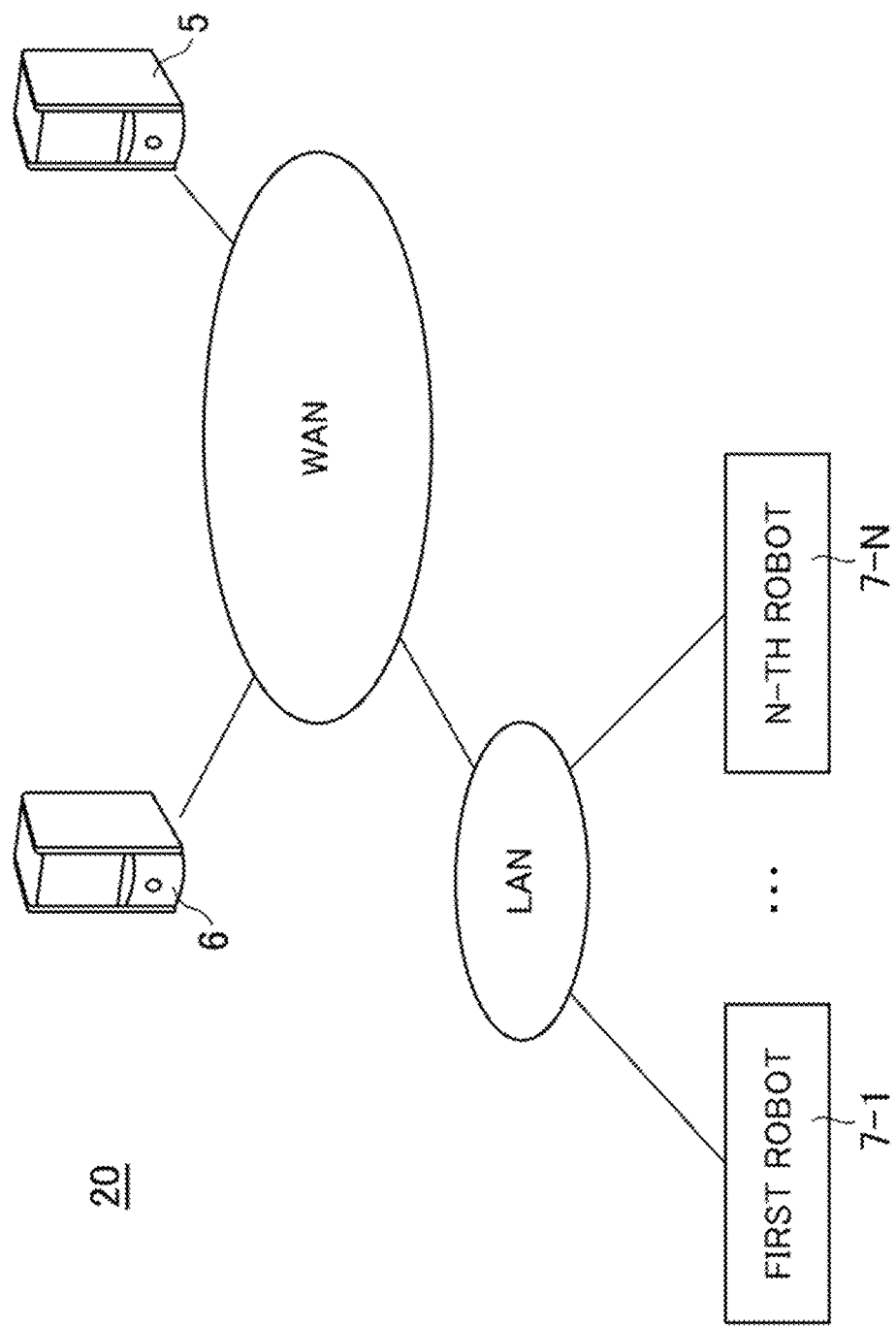
FIG. 10 is an overall configuration diagram of a system (second embodiment).

FIG. 10 is an overall configuration diagram of the system 20 according to this embodiment. As is clear from the drawing, the system 20 according to this embodiment is the same as in the first embodiment in that the server 5 and multiple robots 7 (7-1 to 7-N) as client devices are connected by communication via a network. However, this embodiment differs from the first embodiment in that an intermediate server 6 is interposed between the robots 7 and the final server 5. The intermediate server 6 is operated by, for example, a machine learning technology vendor (AI vendor).

Figure 11:
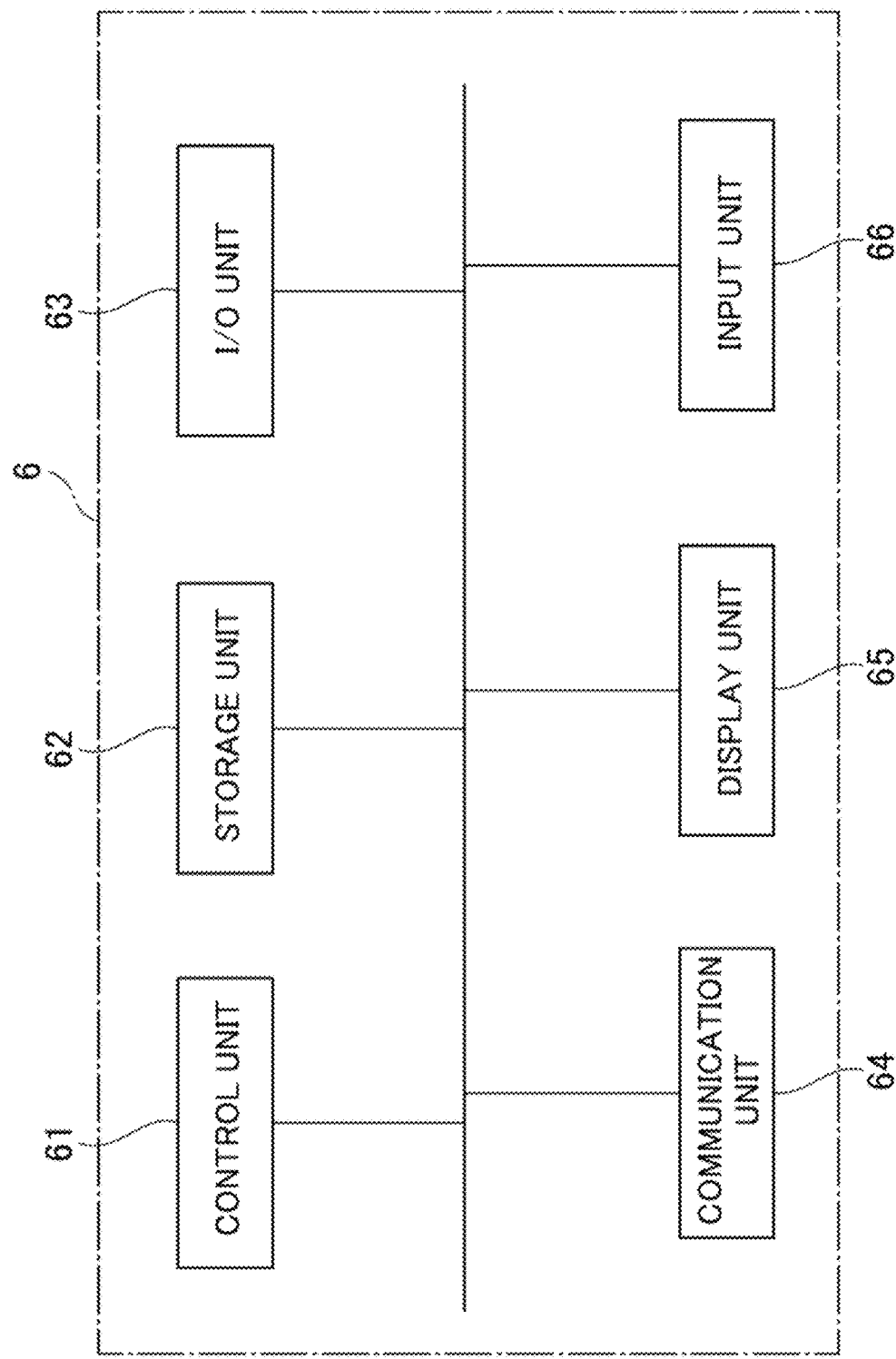
FIG. 11 is a diagram showing the hardware configuration of an intermediate server.

FIG. 11 is a diagram showing the hardware configuration of an intermediate server 6 interposed between the robots 7 and the final server 5. As is clear from the drawing, the intermediate server 6 includes a control unit 61, a storage unit 62, an I/O unit 63, a communication unit 64, a display unit 65, and an input unit 66, which are connected to each other via a system bus or the like. The control unit 61 consists of a processor such as a CPU or GPU and performs execution processing for various programs. The storage unit 62 is a storage device such as a ROM, RAM, hard disk, or flash memory, and stores various data, operation programs, and the like. The I/O unit 63 performs input and output or the like with external devices. The communication unit 64 is, for example, a communication unit that communicates based on a prescribed communication standard, and communicates with the final server 5 and the robots 7 that are client devices. The display unit 65 is connected to a display or the like to present a prescribed display. The input unit 66 receives inputs from the administrator through, for example, a keyboard or a mouse.

Figure 12:
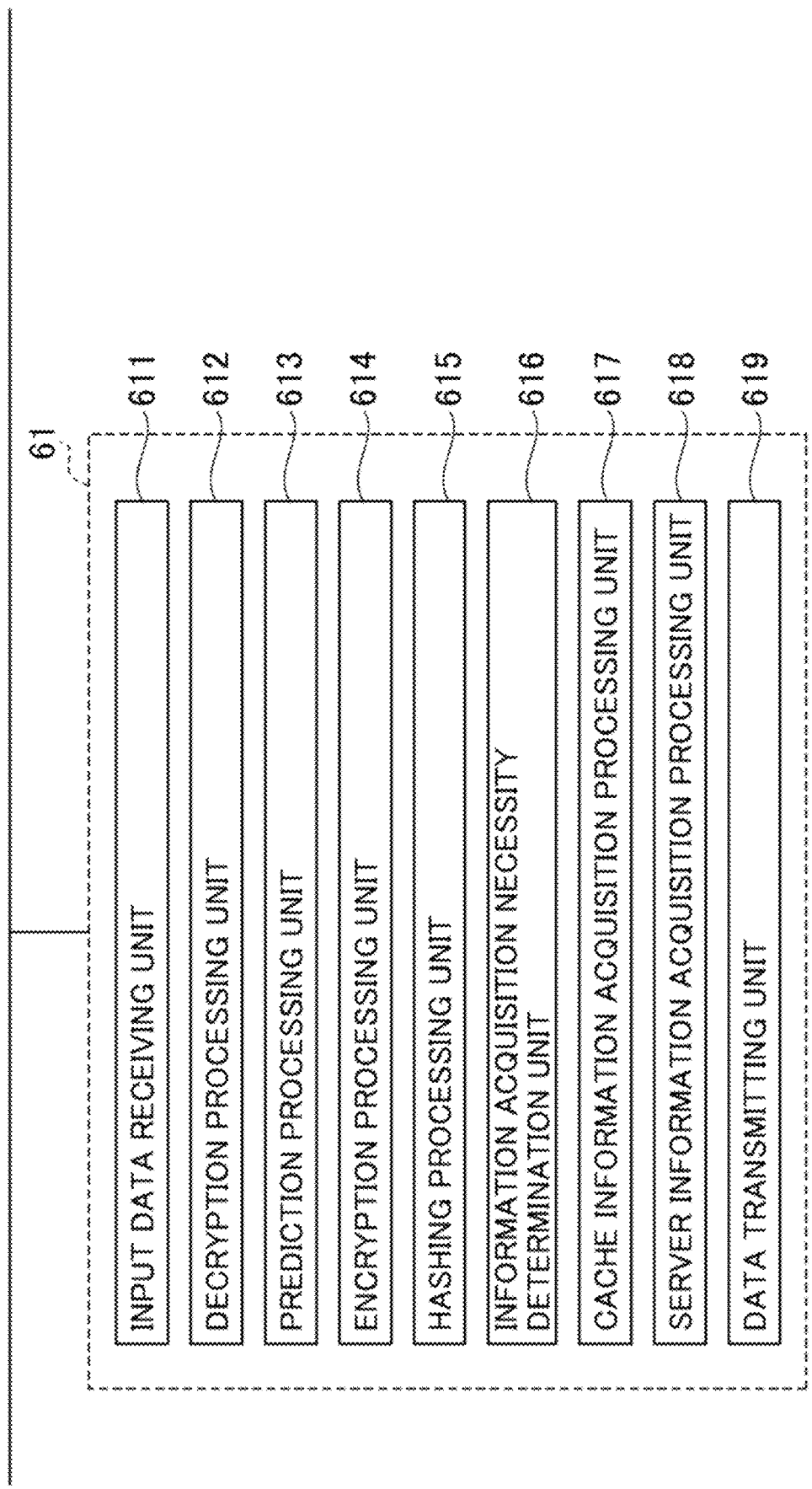
FIG. 12 is a functional block diagram related to the intermediate server (second embodiment).

FIG. 12 is a functional block diagram related to the control unit 61 of the intermediate server 6. As is clear from the drawing, the control unit 61 includes an input data receiving unit 611, a decryption processing unit 612, a prediction processing unit 613, an encryption processing unit 614, a hashing processing unit 615, an information acquisition necessity determination unit 616, a cache information acquisition processing unit 617, a server information acquisition processing unit 618, and a data transmitting unit 619.

The input data receiving unit 611 receives input data from the robots 3 or the final server 5. The decryption processing unit 612 decrypts the data encrypted by a public key or the like with an encryption key, for example. The prediction processing unit 613 reads basic information, weight information, and the like on, for example, the configuration of a prediction model (trained model) generated by supervised learning of a neural network, and generates a prescribed prediction output based on the input data. The encryption processing unit 614 encrypts the input data with a public key or the like. The hashing processing unit 615 generates corresponding hash values by hashing input information, that is, it generates irregular fixed-length values. The information acquisition necessity determination unit 616 determines whether or not the data corresponding to the prescribed data is already stored in a prescribed table. When the information acquisition necessity determination unit 616 determines that the data corresponding to the prescribed data exists, the cache information acquisition processing unit 617 acquires the corresponding data. The server information acquisition processing unit 618 transmits prescribed data to the final server 5 and receives the data corresponding to that data. The data transmitting unit 619 performs processing of transmitting transmission-target data to the robots 3 or the final server 5.

Since the hardware configurations of the final server 5 and the robots 7 are substantially the same as the configurations of the server 1 and the robots 3 of the first embodiment, their description will be omitted here.

<2.2 System Operation>

The operation of the system 20 according to this embodiment will now be described with reference to FIGS. 13 to 16.

The operation of the robot 7 is substantially the same as that in the first embodiment. In other words, as shown in FIGS. 6 and 7, if, according to the determination (S9) in the information acquisition necessity determination processing unit 314, the encrypted output-side middle layer data (Z1') corresponding to the hash value (Y1) does not exist in the hash table (S11 NO), the server information acquisition processing unit 316 transmits the first encrypted input-side middle layer data (X1') to the intermediate server 6 (S15) and then goes into a prescribed waiting mode (S17 NO). Upon reception of the first encrypted output-side middle layer data (Z1') from the server 1 in this waiting mode, the waiting mode is cleared (S17 YES), and processing of associating the received first encrypted output-side middle layer data (Z1') with the hash value (Y1) and saving it is performed (S19).

Figure 13:
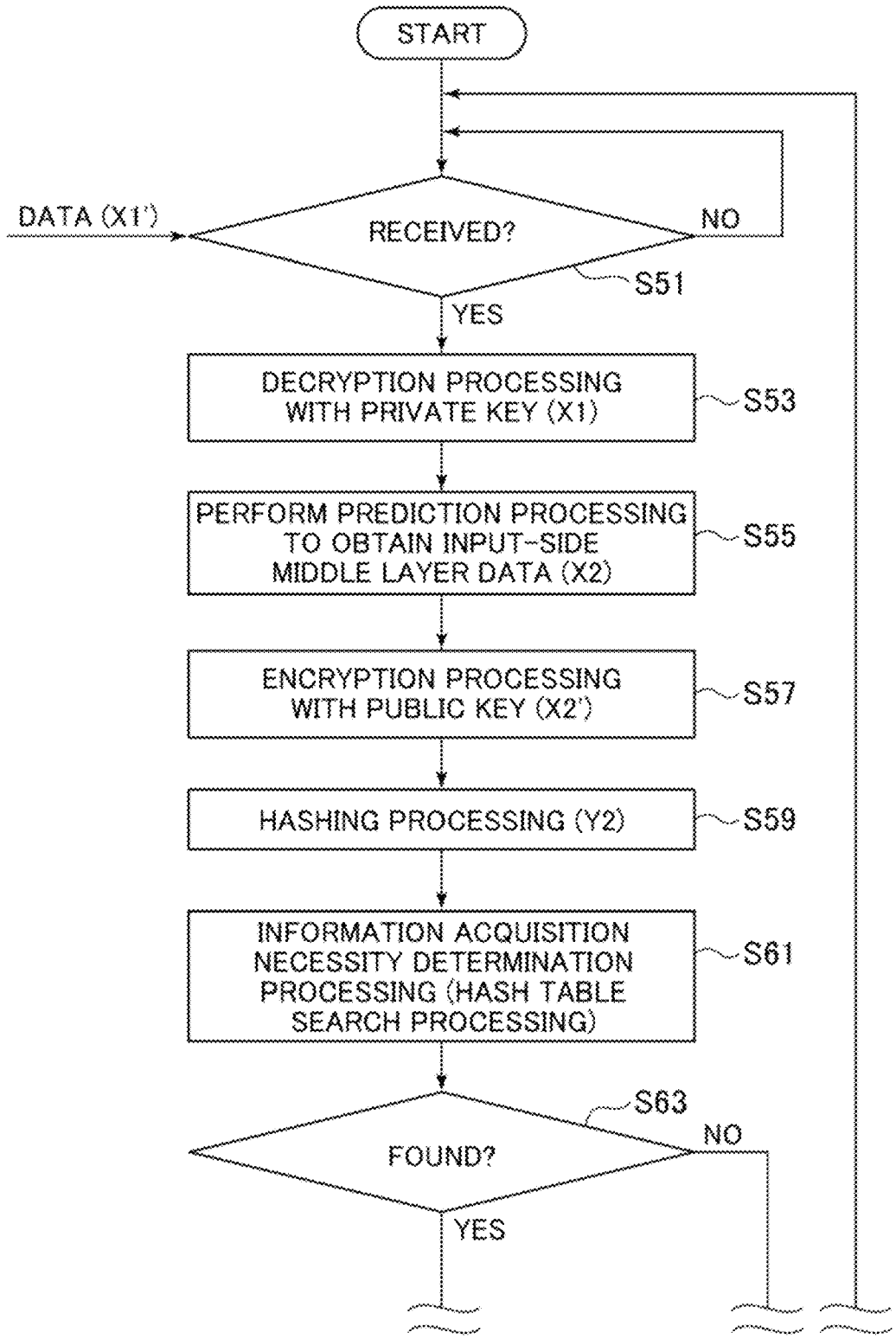
FIG. 13 is a prediction processing in the intermediate server (second embodiment) (No. 1).
Figure 14:
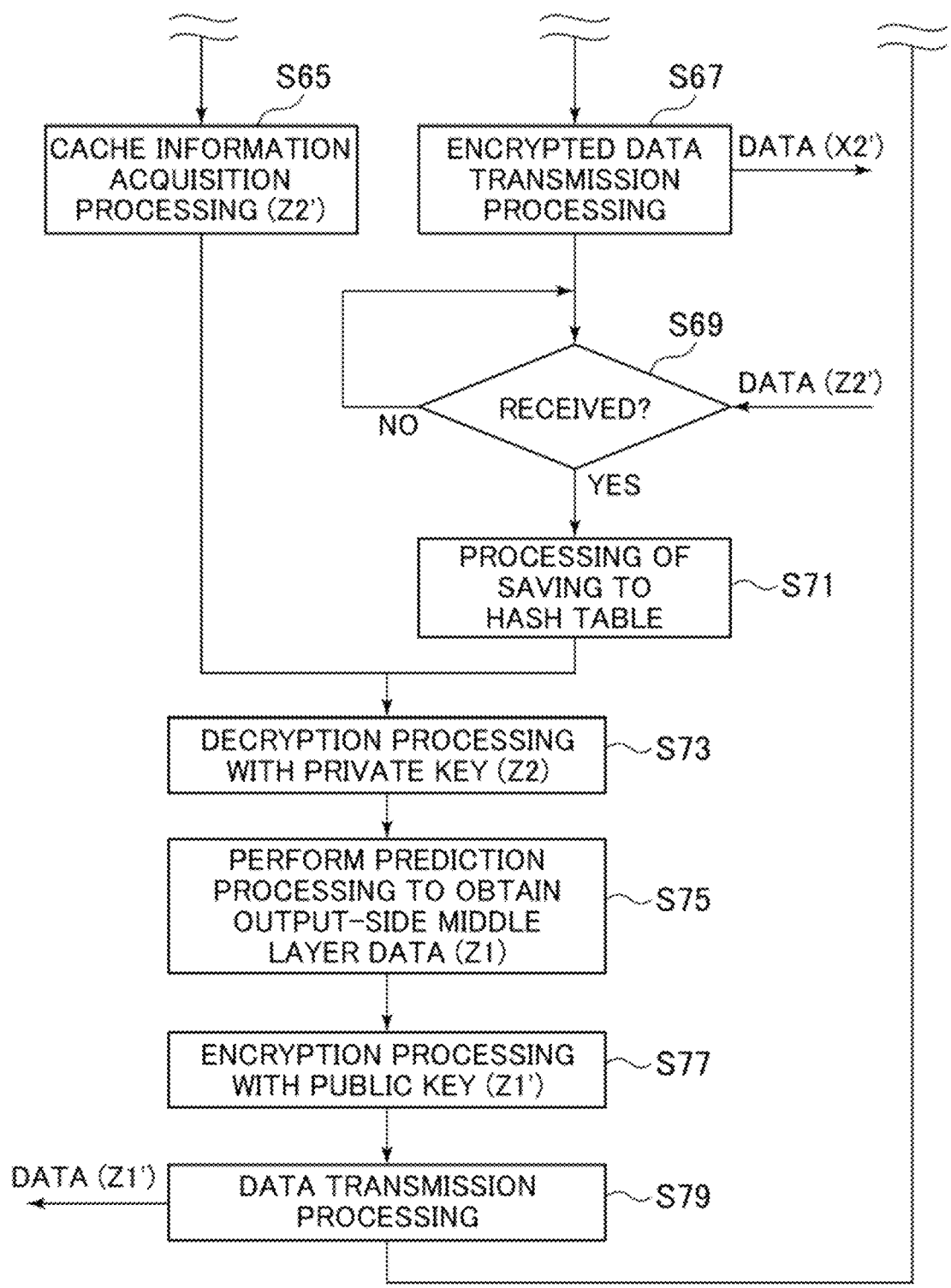
FIG. 14 is a prediction processing in the intermediate server (second embodiment) (No. 2).

FIGS. 13 and 14 are flowcharts related to the prediction processing operation in the intermediate server 6. When the prediction processing starts, the intermediate server 6 goes into a prescribed waiting mode with the input data receiving unit 611 (S51 NO). After that, upon reception of the first encrypted input-side middle layer data (X1') from the robot 7 (S51 YES), the waiting mode is cleared. After that, the decryption processing unit 612 performs decryption processing of the received first encrypted input-side middle layer data (X1') with a private key, and generates the first input-side middle layer data (X1) (S53).

The prediction processing unit 613 performs prediction processing from the first middle layer to the third middle layer based on the decrypted first input-side middle layer data (X1), thereby generating the second input-side middle layer data (X2) (S55). The encryption processing unit 614 encrypts the second input-side middle layer data (X2) with a public key to generate the second encrypted input-side middle layer data (X2') (S57). The hashing processing unit 615 performs a hashing processing of the second encrypted input-side middle layer data (X2') and generates the second hash value (Y2) (S59).

The information acquisition necessity determination unit 616 then reads the second hash table stored in the intermediate server 6, and determines whether or not the second encrypted output-side middle layer data (Z2') corresponding to the generated second hash value (Y2) exists in the second hash table (S61). If, according to this determination (S9), the second encrypted output-side middle layer data (Z2') corresponding to the second hash value (Y2) exists in the hash table (S63 YES), the cache information acquisition processing unit 617 performs processing of acquiring the second encrypted output-side middle layer data (Z2') as cache information (S65).

In contrast, if, according to the determination, the second encrypted output-side middle layer data (Z2') corresponding to the second hash value (Y2) does not exist in the second hash table (S63 NO), the server information acquisition processing unit 618 transmits the second encrypted input-side middle layer data (X2') to the server 1 (S67) and then goes into a prescribed waiting mode (S69 NO). Upon reception of the second encrypted output-side middle layer data (Z2') from the final server 5 in this waiting mode, the waiting mode is cleared (S69 YES), and processing of associating the received second encrypted output-side middle layer data (Z2') with the second hash value (Y2) and saving it is performed (S71). The operation of the final server 5 during this period will be explained later in FIG. 15.

The decryption processing unit 612 generates the second output-side middle layer data (Z2) by decrypting the acquired second encrypted output-side middle layer data (Z2') with a private key (S73). The prediction processing unit 613 then performs prediction processing from the fourth middle layer to the second middle layer based on the generated second output-side middle layer data (Z2), thereby generating the first output-side middle layer data (Z1) (S75). The encryption processing unit 614 performs encryption processing of the first output-side middle layer data (Z1) to generate the first encrypted output-side middle layer data (Z1') (S77). The data transmitting unit 619 then transmits the first encrypted output-side middle layer data (Z1') to the robot 7. Upon completion of this transmission processing, the intermediate server 6 returns again to the reception waiting mode (S51 NO), and a series of processing (S51 to S79) is then repeated.

Figure 15:
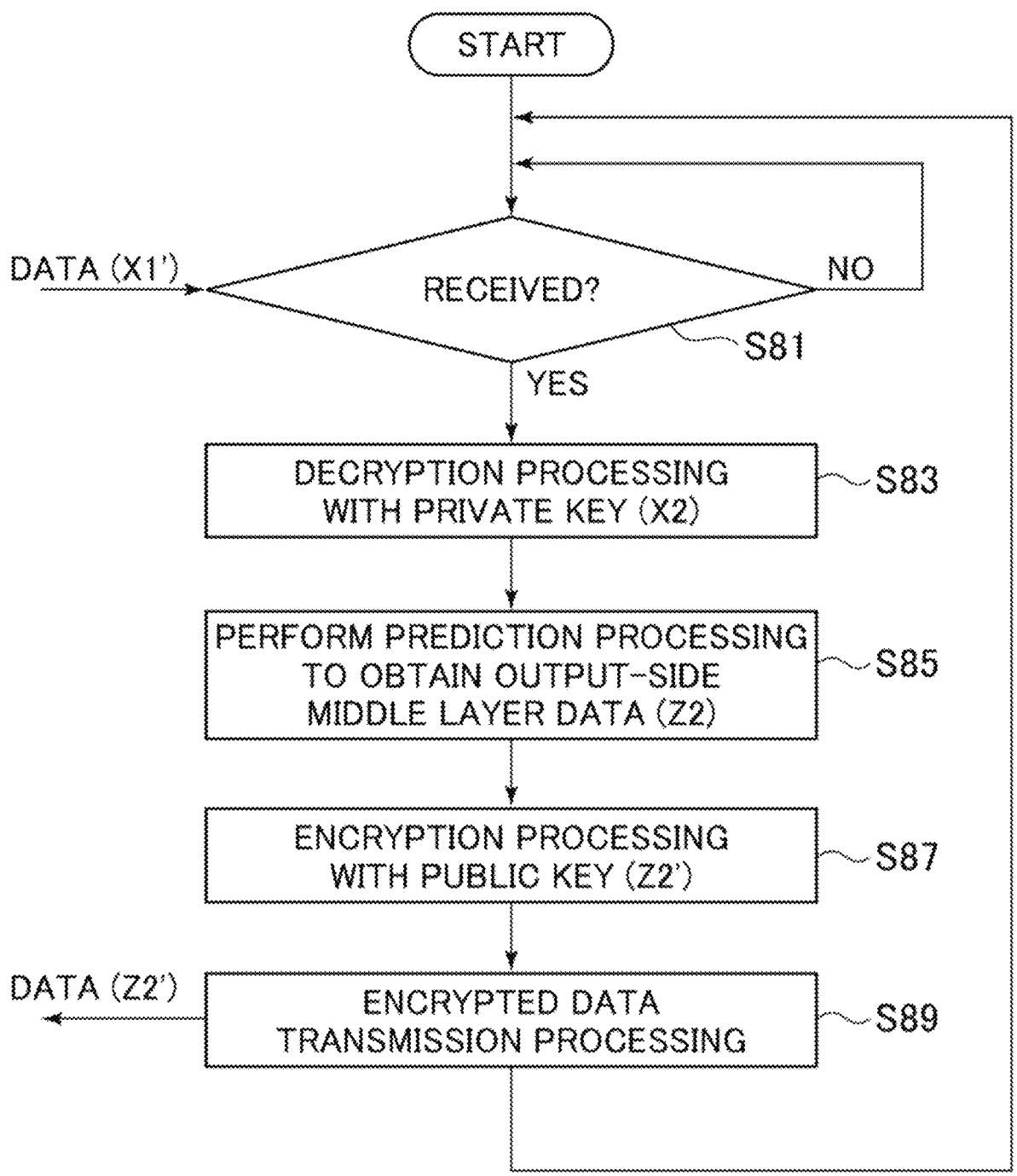
FIG. 15 is a prediction processing in a final server (second embodiment).

FIG. 15 is a flowchart related to the prediction processing operation in the final server 5.

When the prediction processing is started, the final server 5 goes into a prescribed waiting mode with the input data receiving unit 111 (S81 NO). Upon reception of the second encrypted input-side middle layer data (X2') from the intermediate server 6 in this state, the waiting mode is cleared (S81 YES). The decryption processing unit 112 performs decryption processing of the received second encrypted input-side middle layer data (X2') with a private key, and generates the second input-side middle layer data (X2) (S83). The prediction processing unit 113 then performs prediction processing from the third middle layer to the fourth middle layer by using this second input-side middle layer data (X2) as an input, thereby generating the second output-side middle layer data (Z2) (S85).

The encryption processing unit 114 encrypts this second output-side middle layer data (Z2) with a public key to generate the second encrypted output-side middle layer data (Z2') (S87). The data transmitting unit 115 then transmits the second encrypted output-side middle layer data (Z2') to the intermediate server 6 (S89). Upon completion of this transmission processing, the final server 5 returns again to the reception waiting mode (S81), and a series of processing (S81 to S89) is then repeated.

Figure 16:
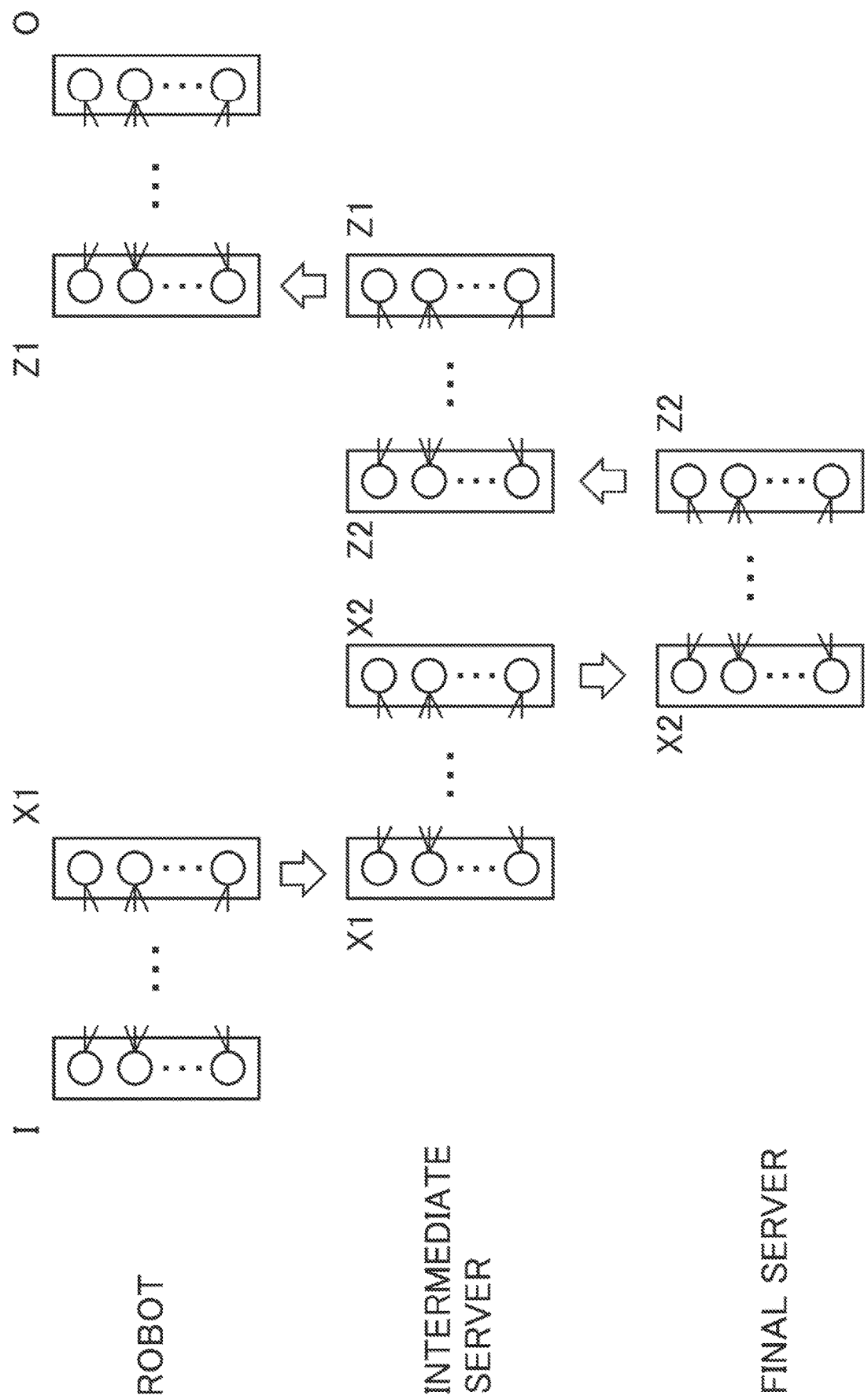
FIG. 16 is a conceptual diagram related to a prediction processing (second embodiment).

FIG. 16 is a conceptual diagram of the prediction processing implemented with the system 20 according to this embodiment. In the drawing, the upper part is a conceptual diagram of the prediction processing performed in the robot 7, the middle part is a conceptual diagram of the prediction processing performed in the intermediate server 6, and the lower part is a conceptual diagram of the prediction processing performed in the final server 5. The left side of the drawing shows the input side, and the right side shows the output side.

As is clear from the drawing, when the sensor information (I) is input to the robot 3, the prediction processing unit 312 performs prediction processing from the input stage to the first middle layer, thereby generating the first input-side middle layer data (X1). The first input-side middle layer data (X1) is then encrypted and transmitted to the intermediate server 6 and is decrypted in the intermediate server 6.

In the intermediate server 6, the prediction processing unit 613 performs prediction processing between the first middle layer and the third middle layer to generate the second input-side middle layer data (X2). The second input-side middle layer data (X2) is then encrypted and transmitted to the final server 5 and is decrypted in the final server 5.

In the final server 5, the prediction processing unit 113 performs prediction processing from the third middle layer to the fourth middle layer by using the second input-side middle layer data (X2) as an input, thereby generating the second output-side middle layer data (Z2). The second output-side middle layer data (Z2) is then encrypted and transmitted to the intermediate server 6 and is decrypted in the intermediate server 6.

In the intermediate server 6, the prediction processing unit 613 performs prediction processing between the fourth middle layer and the second middle layer to generate the first output-side middle layer data (Z1). The first output-side middle layer data (Z1) is then encrypted and transmitted to the robot 7 and is decrypted in the robot 7.

In the robot 7, the prediction processing unit 312 performs prediction processing between the second middle layer and the output layer to generate the final output (O).

With such a configuration, which has servers provided in multiple stages, the processing load in each device in the client device and each server can be reduced, and at the same time, the economies of scale given by providing multiple stages can be expected to enhance the prediction performance of the client device. Besides, even if multiple stages are provided in this way, the processing speed is unlikely to drop because each server also performs prediction processing based on the cache information. Since the prediction models are distributed, the safety of the system, for example, is expected to be further improved, and management of each of the servers can be shared by multiple administrators.

3. Third Embodiment

In this embodiment, a system 30 performs learning processing in addition to prediction processing.

<3.1 System Configuration>

The configuration of the system 30 according to this embodiment is substantially the same as that shown in the second embodiment. However, they differ in that each control unit of the robots 7, the intermediate server 6, and the final server 5 has a functional block for learning processing besides prediction processing.

Figure 17:
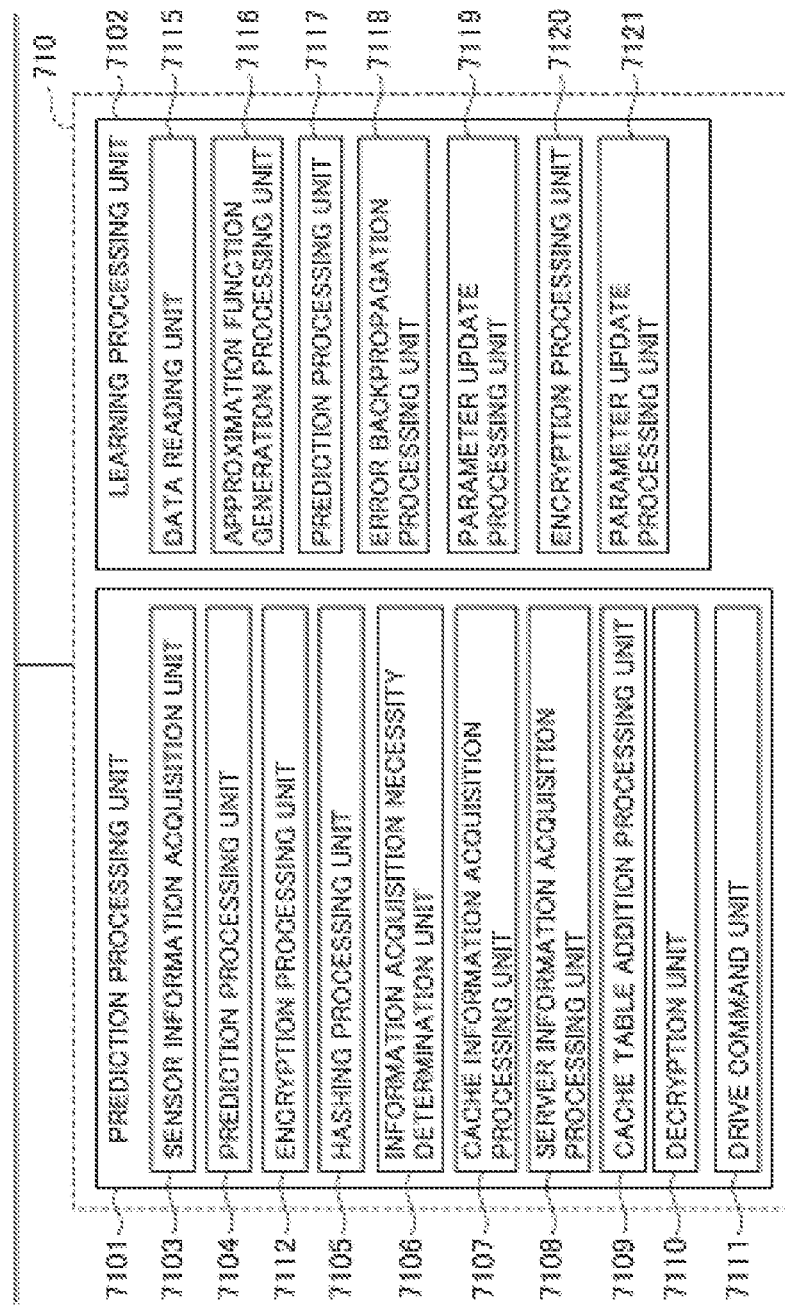
FIG. 17 is a functional block diagram related to a robot (third embodiment).

FIG. 17 is a functional block diagram of the control unit 710 of a robot 7.

In the drawing, the features of the prediction processing unit 7101 are substantially the same as the configuration shown in FIG. 4, and thus its detailed description will be omitted. Note that the prediction processing unit 7101 is different in that it further includes a cache table addition processing unit 7109. The cache table addition processing unit 7109 performs decryption processing (S21) shown in FIG. 7 to generate the output-side middle layer data (Z1) and then performs processing of additionally storing the output-side middle layer data (Z1) in the cache table together with the corresponding input-side middle layer data (X1). This cache table is used for the learning processing described later.

The control unit 710 further includes a learning processing unit 7102. The learning processing unit 7102 includes a data reading unit 7102, an approximation function generation processing unit 7116, a prediction processing unit 7117, an error backpropagation processing unit 7118, a parameter update processing unit 7119, an encryption processing unit 7120, and a data transmission processing unit 7121.

The data reading unit 7115 performs processing of reading various data stored in the robot 7. The approximation function generation processing unit 7116 generates an approximation function by a method, which will be described later, based on a cache table related to a prescribed input and output correspondence relationship. The prediction processing unit 7117 reads basic information, weight information, and the like on, for example, the configuration of a prediction model (trained model) generated by supervised learning of a neural network, and generates a prescribed prediction output based on the input data.

The error backpropagation processing unit 7118 performs processing of propagating an error obtained by comparing the output of the prediction model with the teacher data, from the output side to the input side of the model (Backpropagation). The parameter update processing unit 7119 performs processing of updating model parameters such as weights so as to reduce the error between the output of the prediction model and the teacher data. The encryption processing unit 7120 performs processing of encrypting prescribed target data with a public key or the like. The data transmission processing unit 7121 performs processing of transmitting prescribed target data to the intermediate server 6.

Figure 18:
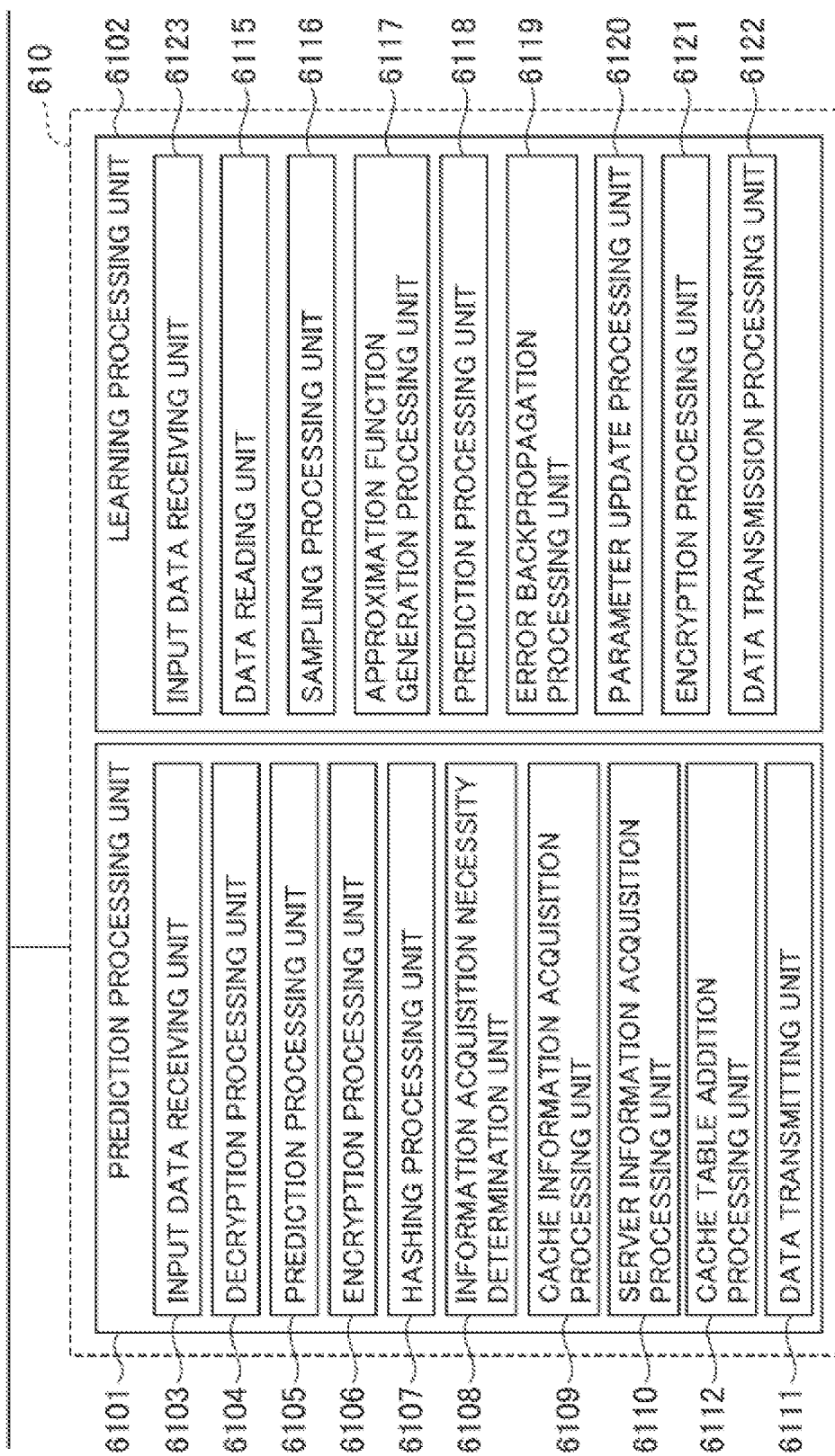
FIG. 18 is a functional block diagram related to an intermediate server (third embodiment).

FIG. 18 is a functional block diagram of the control unit 610 of the intermediate server 6.

In the drawing, the features of the prediction processing unit 6101 are substantially the same as the configuration shown in FIG. 12, and its detailed description will therefore be omitted. Note that the prediction processing unit 6101 is different in that it further includes a cache table addition processing unit 6112. The cache table addition processing unit 6112 performs decryption processing (S75) shown in FIG. 14 to generate the second output-side middle layer data (Z2), and then performs processing to additionally store the second output-side middle layer data (Z2) in the cache table together with the corresponding second input-side middle layer data (X2). This cache table is used for the learning processing described later.

The control unit 610 further includes a learning processing unit 6102. The learning processing unit 6102 includes an input data receiving unit 6123, a data reading unit 6115, a sampling processing unit 6116, an approximation function generation processing unit 6117, a prediction processing unit 6118, an error backpropagation processing unit 6119, a parameter update processing unit 6120, an encryption processing unit 6121, and a data transmission processing unit 6122.

The input data receiving unit 6123 performs processing of receiving, decrypting, and storing various data such as a first cache table received from the robot 7. The data reading unit 6115 performs processing of reading various data stored in the intermediate server 6. The sampling processing unit 6116 performs processing of selecting a data set to be a learning target from the cache table. The approximation function generation processing unit 6117 generates an approximation function by a method, which will be described later, based on a cache table related to a prescribed input and output correspondence relationship. The prediction processing unit 6118 reads basic information, weight information, and the like on, for example, the configuration of a prediction model (trained model) generated by supervised learning of a neural network, and generates a prescribed prediction output based on the input data.

The error backpropagation processing unit 6119 performs processing of propagating an error obtained by comparing the output of the prediction model with the teacher data, from the output side to the input side of the model (Backpropagation). The parameter update processing unit 6120 performs processing of updating model parameters such as weights so as to reduce the error between the output of the prediction model and the teacher data. The encryption processing unit 6121 performs processing of encrypting prescribed target data with a public key or the like. The data transmission processing unit 6122 performs processing of transmitting prescribed target data to the robot 7 or final server 5.

Figure 19:
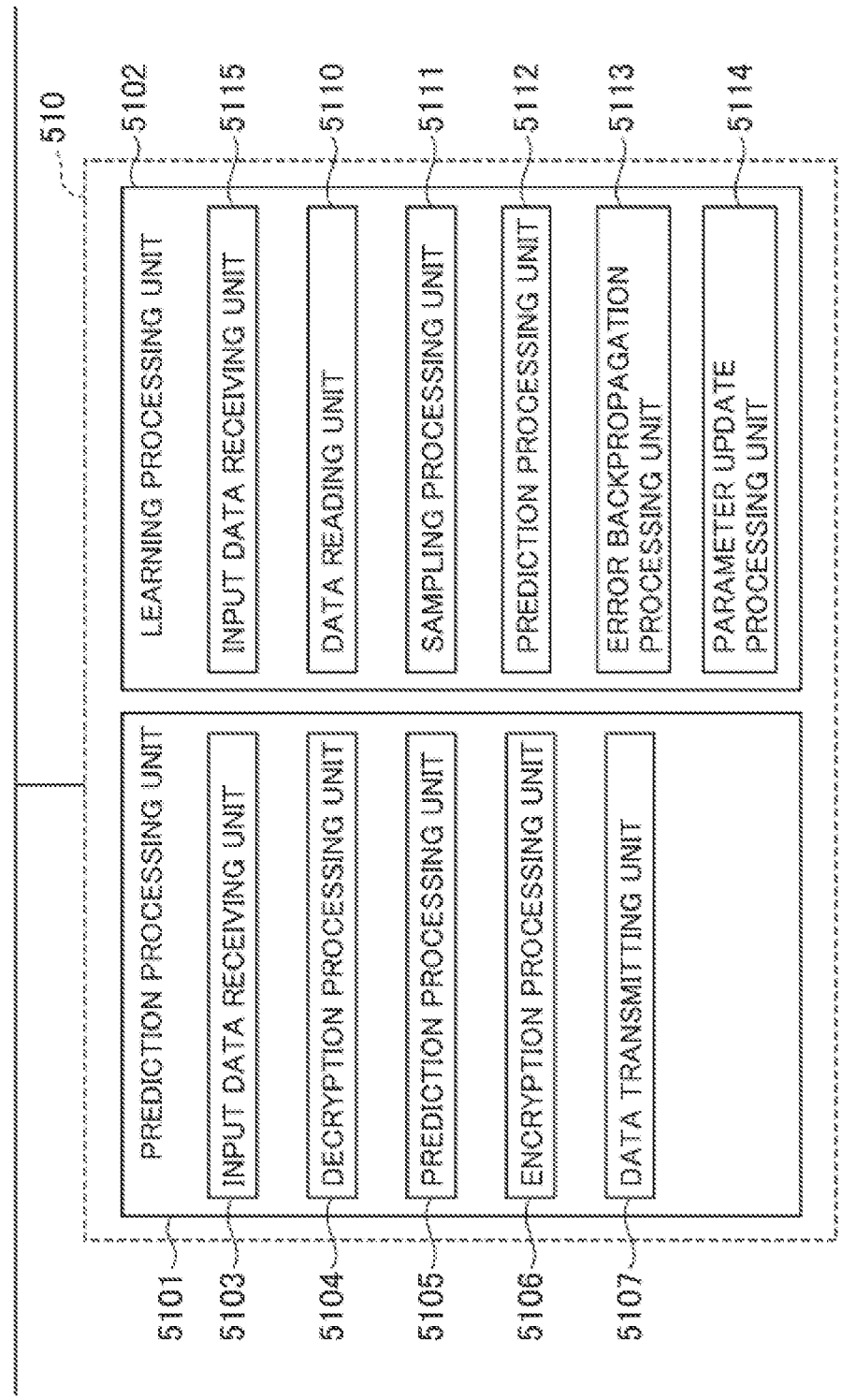
FIG. 19 is a functional block diagram related to a final server (third embodiment).

FIG. 19 is a functional block diagram of the control unit 510 of the final server 5.

In the drawing, the features of the prediction processing unit 5101 are substantially the same as the configuration shown in FIG. 5, and its detailed description will therefore be omitted.

The control unit 510 further includes a learning processing unit 5102. The learning processing unit 5102 includes an input data receiving unit 5115, a data reading unit 5110, a sampling processing unit 5111, a prediction processing unit 5112, an error backpropagation processing unit 5113, and a parameter update processing unit 5114.

The input data receiving unit 5115 performs processing of receiving, decrypting, and storing various data such as a second cache table received from the intermediate server 6. The data reading unit 5110 performs processing of reading various data stored in the final server 5. The sampling processing unit 5111 performs processing of selecting a data set to be a learning target from the second cache table. The prediction processing unit 5112 reads basic information, weight information, and the like on, for example, the configuration of a prediction model (trained model) generated by supervised learning of a neural network, and generates a prescribed prediction output based on the input data.

The error backpropagation processing unit 5113 performs processing of propagating an error obtained by comparing the output of the prediction model with the teacher data, from the output side to the input side of the model (Backpropagation). The parameter update processing unit 5114 performs processing of updating model parameters such as weights so as to reduce the error between the output of the prediction model and the teacher data.

<3.2 System Operation>

The operation of the system 30 will now be described with reference to FIGS. 20 to 26. Note that the prediction processing operation is substantially the same as in the second embodiment, and its description will therefore be omitted here.

Figure 20:
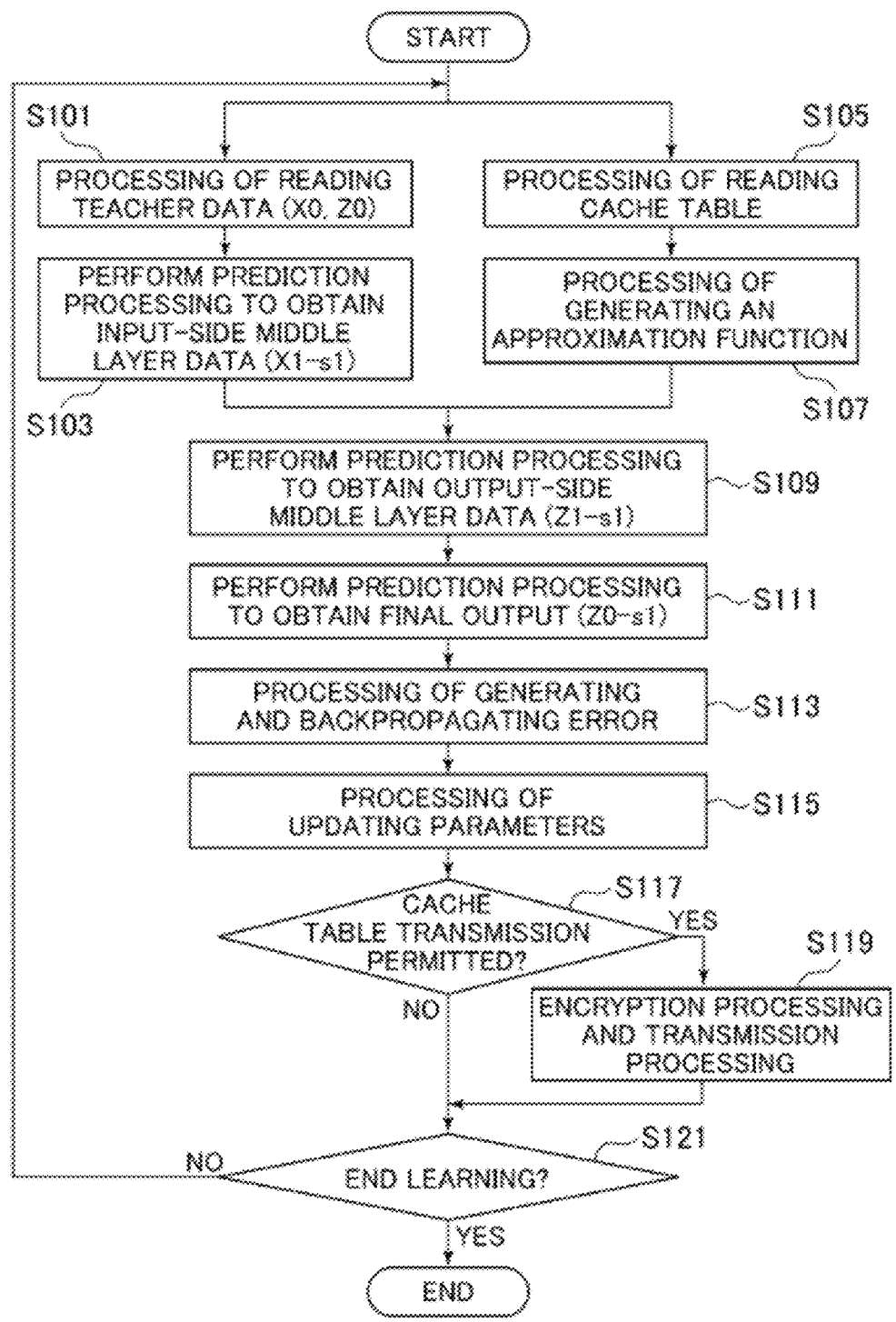
FIG. 20 is a learning process in the robot (third embodiment).

FIG. 20 is a flowchart of learning processing operation in a robot 7. As is clear from the drawing, when learning processing operation starts, the data reading unit 7115 reads an input and output pair (X0, Z0) from the input and output data table stored in the robot 7 and corresponding to the teacher data (S101). Upon this reading, the prediction processing unit 7117 performs prediction processing in the section extending from the input layer of the prediction model to the first middle layer based on the input data X0, thereby generating the input-side middle layer data (X1-s1) (S103).

Meanwhile, concurrently with these steps (S101 to S103), the data reading unit 7115 performs processing of reading the first cache table including correspondence between the first input-side middle layer data (X1) and the first output-side middle layer data (Z1) accumulated in the robot 7 during prediction processing (S105). After reading of the first cache table, processing of generating an approximation function is performed based on the first cache table (S107).

The processing of generating the approximation function will now be explained in detail. Data conversion (cache conversion) that generates the data (Z1) of the first output-side middle layer (temporarily referred to as Z layer for convenience of explanation), using the data (X1) of the first input-side middle layer (temporarily referred to as X layer for convenience of explanation) as an input can be expressed as follows.

$$\vec{z} = s(\vec{x}) \quad (1)$$

Here, the vector representing the data of the X layer composed of n neurons can be expressed as follows.

$$\vec{x} = (x_1, \ldots, x_{n_i}, \ldots, x_n) \quad (2)$$

Similarly, the vector representing the data of the Z layer composed of N neurons can be expressed as follows.

$$\vec{z} = (z_1, \ldots, z_k, \ldots, z_N) \quad (3)$$

The k-th value zk of the Z layer, which can be calculated independently of the other N−1 values from the formula (1), can be expressed as follows.

$$z_k = S_k(\vec{x}) \quad (4)$$

At this time, the conversion function Sk cannot be converted to the k-th value of the corresponding Z layer if the combination of each of the component values of the data vector of the X layer does not exist in the first cache table due to the nature of the cache conversion. Therefore, approximation is made by the formula (5) that is a linear equation such as the following.

$$z_k = \left( \sum_m^n w_{km} x_m \right) + b \quad (5)$$

Note that the variable in the formula (5) is the following (n+1).

$$w_{k1}, \ldots, w_{kn}, b \quad (6)$$

Therefore, in order to obtain the solution of the formula (5), (n+1) pieces of data should be extracted from the formula (4) and the following simultaneous linear equation in (n+1) unknowns should be solved.

$$\begin{cases} z_{k,j} = w_{k1}x_{1,j} + \ldots + w_{km}x_{m,j} + \ldots + w_{kn}x_{n,1} + b \\ \ldots \\ z_{k,j} = w_{k1}x_{1,j} + \ldots + w_{km}x_{m,j} + \ldots + w_{kn}x_{n,1} + b \\ \ldots \\ z_{k,n-1} = w_{k1}x_{1,n+1} + \ldots + w_{km}x_{m,n+1} + \ldots + w_{kn}x_{n,n+1} + b \end{cases} \quad (7)$$

Figure 21:
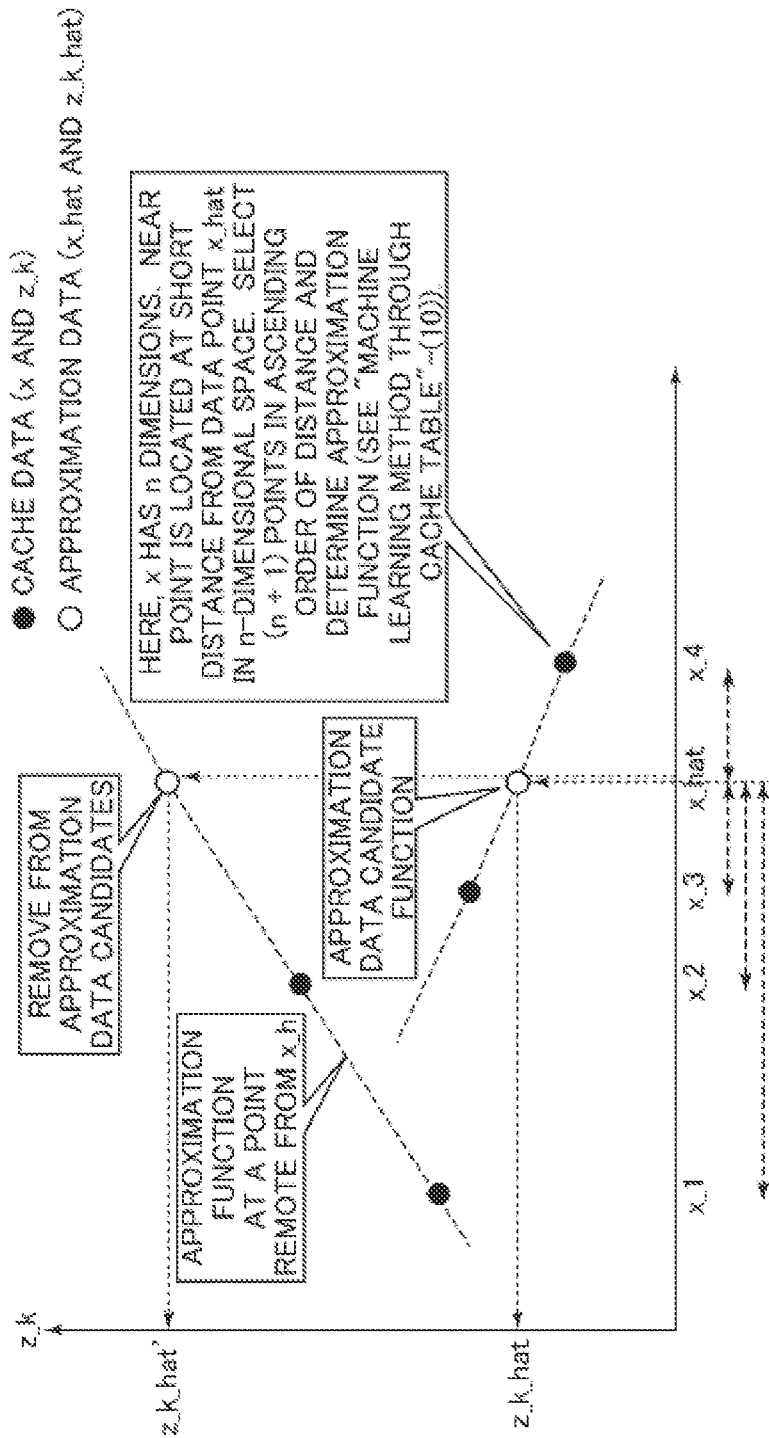
FIG. 21 is a conceptual diagram related to approximation data.

For extraction of the (n+1) pieces of data, the cache data near the target point for which an approximate value is desired, is preferably selected. This is because fluctuations in approximation errors can be suppressed by extracting as much cache data as possible near the target point for which the approximate value is desired. FIG. 21 shows a conceptual diagram related to the extraction of such cache data.

Here, the following definition can be made.

$$\beta_k = (z_{k,1}, \ldots, z_{k,p}, \ldots, z_{k,n+1}) \quad (8)$$

Then, the formula (7) can be simply expressed as follows.

$$A = \begin{pmatrix} x_{j,1} & \ldots & x_{m,j} & \ldots & x_{n,1} & 1 \\ \vdots & \ddots & \vdots & \ddots & \vdots & \vdots \\ x_{l,j} & \ldots & x_{m,j} & \ldots & x_{n,j} & 1 \\ \vdots & \ddots & \vdots & \ddots & \vdots & \vdots \\ x_{l,n+1} & \ldots & x_{m,n+1} & \ldots & x_{n,n+1} & 1 \end{pmatrix} \quad (9)$$

$$v_k = (w_{k1}, \ldots, w_{km}, \ldots, w_{kn}, b)$$

$$Av_k = \beta_k$$

If A, which is the square matrix of the order (n+1), is a regular matrix, the formula (9) uniquely has the following solution vk.

$$v_k = \hat{v}_k = (\hat{w}_{k1}, \ldots, \hat{w}_{km}, \ldots, \hat{w}_{kn}, \hat{b}) \quad (10)$$

In other words, the solution vk of the formula (10) can be obtained by calculating the formula (9) with a computer according to an algorithm such as Gaussian elimination. By substitution of this solution vk, the formula (5) can be expressed as follows.

$$z_k = \left( \sum_m^n \hat{w}_{km} x_m \right) + \hat{b} \quad (11)$$

In other words, this formula (11) is an approximation expression. As is clear from this formula, since approximate partial differentiation is applicable to each component of the data vector of the X layer, errors can be easily back propagated from the Z layer to the X layer, for example. In other words, before and after the learning model part to which the cache table corresponds, that is, for example, even if each machine learning model of the input-side and output-side multiple layer neural network models, learning processing can be performed at high speed using error backpropagation method.

Returning to the flowchart of FIG. 20, upon completion of the processing (S103) of generating the first input-side middle layer data (X1-s1) and the processing (S107) of generating an approximation function, the prediction processing unit 7117 performs, based on the first input-side middle layer data (X1) and the approximation function, prediction processing for the section extending from the first middle layer to the second middle layer and generates output-side middle layer data (Z1-s1) (S109). After that, the prediction processing unit 7117 performs prediction processing using the output-side middle layer data (Z1-s1) as an input, for the section extending from the second middle layer to the output layer, thereby generating a final output (Z0-s1) (S111).

The error backpropagation processing unit 6119 generates an error between the teacher output (Z0) according to the teacher data and the final output (Z0-s1), and the error or a prescribed value (for example, root mean square error) based on the error is propagated from the output side to the input side by methods such as the steepest descent method (S113).

After that, the parameter update processing unit 7119 performs, based on the back propagated error and the like, processing of updating the parameters such as weights of the section extending from the input layer to the first middle layer and the section extending from the second middle layer to the output layer of the learning model, excluding the approximation function part (S115).

After that, the robot 7 checks whether or not transmission of the first cache table is permitted, from prescribed settings information (S117). As a result, if no transmission permission is granted, learning ending determination (S121) is made, and if it is determined not to end (S121 NO), all the processings (S101 to S121) are repeated again. In contrast, if it is determined to end (S121 YES), the learning processing ends.

In contrast, if permission to transmit the cache table is granted (S117 YES), the data transmission processing unit 7121 performs processing of transmitting the first cache table that was encrypted by the encryption processing unit 7120, to the intermediate server 6 (S119). This is followed by the learning ending determination (S121).

The learning processing operation in the intermediate server 6 will now be explained.

Figure 22:
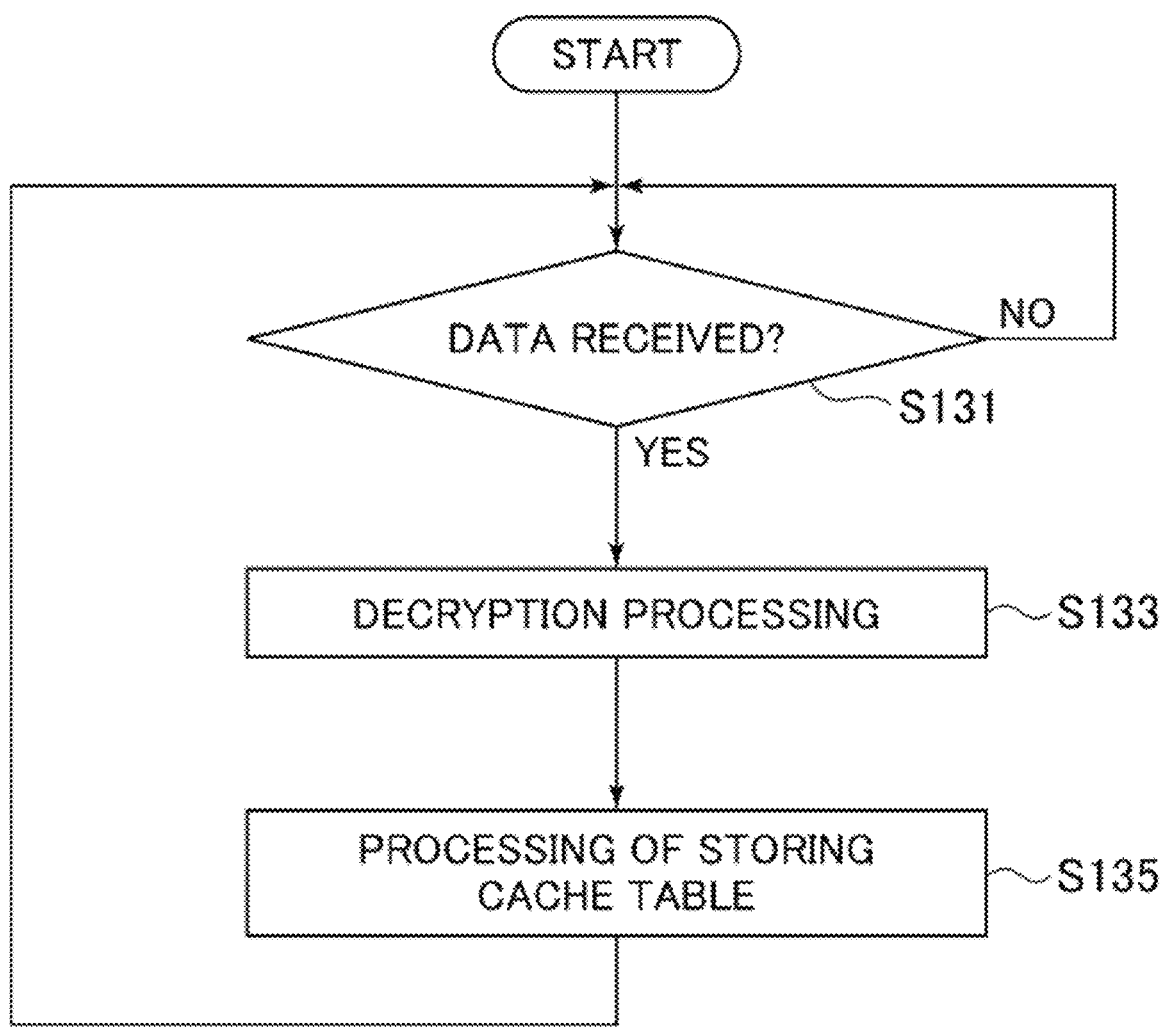
FIG. 22 is a storage processing in the intermediate server (third embodiment).

FIG. 22 is a flowchart related to processing of reception and storage of the first cache table transmitted from the robot 7. As is clear from the drawing, when the learning processing is started in the intermediate server 6, the input data receiving unit 6123 goes into the data reception waiting mode (S131). If, in this state, the data corresponding to the encrypted first cache table is received (S131 YES), the data reception waiting mode is cleared, the received first cache data is decrypted with a private key or the like (S133), and processing of storing it in the storage unit is performed (S135). Upon completion of this storage processing, the intermediate server 6 again goes into the reception waiting mode (S131 NO).

Figure 23:
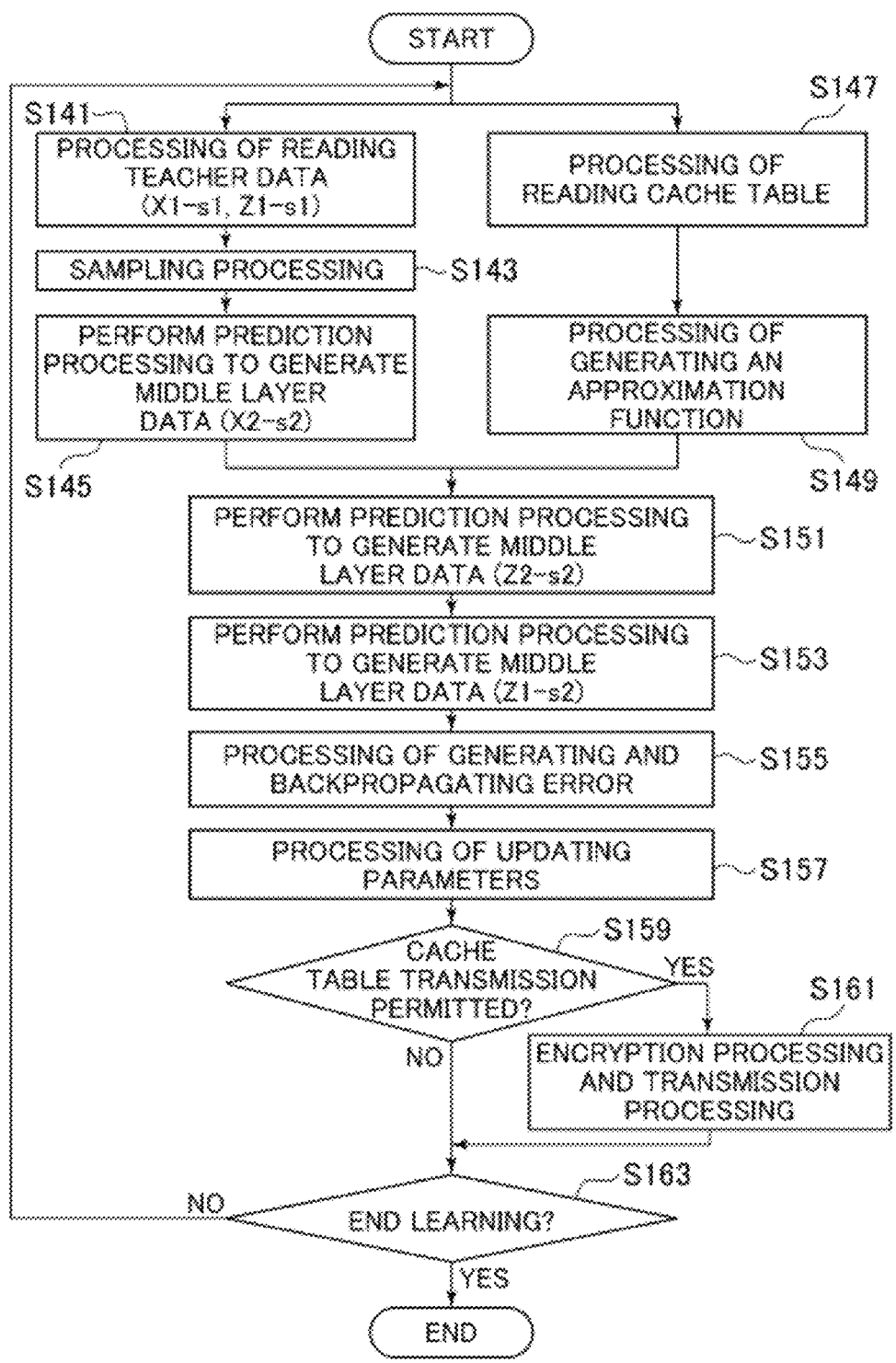
FIG. 23 is a learning process in the intermediate server (third embodiment).

FIG. 23 is a flowchart related to the learning processing operation in the intermediate server 6 executed concurrently with the processing of receiving the first cache table shown in FIG. 22. As is clear from the drawing, when learning processing operation starts, the data reading unit 6115 reads an input and output pair (X1-s1, Z1-s1) from the input and output data table stored in the intermediate server 6 and corresponding to the teacher data (S141). Upon reading of the input and output pair, the sampling processing unit 6116 extracts the input and output pair to be used for learning (S143). After this extraction processing, the prediction processing unit 6118 performs prediction processing in the section extending from the first middle layer to the third middle layer of the prediction model according to the input data (X1-s1), thereby generating the second input-side middle layer data (X2-s2) (S145).

Meanwhile, concurrently with these steps (S141 to S145), the data reading unit 6115 performs processing of reading the second cache table (X2 and Z2) including correspondence between the second input-side middle layer data (X2) and the first output-side middle layer data (Z2) accumulated in the intermediate server 6 during prediction processing (S147). After reading of the second cache table, processing of generating, based on the second cache table, an approximation function in such a way that the second output-side middle layer data (Z2) is generated based on the second input-side middle layer data (X2) is performed (S149). The approximation function generating processing is the same as the approximation function generation in the robot 7.

Upon completion of the processing (S145) of generating the second input-side middle layer data (X2-s2) and the processing (S149) of generating an approximation function, the prediction processing unit 6118 performs, based on the second input-side middle layer data (X2-s2) and the approximation function, prediction processing for the section extending from the third middle layer to the fourth middle layer and generates the second output-side middle layer data (Z2-s2) (S151). After that, the prediction processing unit 6118 performs prediction processing using the second output-side middle layer data (Z2-s2) as an input, for the section extending from the fourth middle layer to the second middle layer, thereby generating the second output-side prediction output (Z1-s2) (S153).

The error backpropagation processing unit 6119 generates an error between the teacher data (Z1-s1) and the second output-side prediction output (Z1-s2), and the error or a prescribed value (for example, root mean square error) based on the error is propagated from the output side to the input side by methods such as the steepest descent method (S155).

After that, the parameter update processing unit 6120 performs, based on the back propagated error and the like, processing of updating the parameters such as weights of the section extending from the first middle layer to the third middle layer and the section extending from the fourth middle layer to the second middle layer of the learning model, excluding the approximation function part (S157).

After that, the intermediate server 6 checks whether or not transmission of the second cache table (X2-s2 and Z2-s2) is permitted, from prescribed settings information (S159). As a result, if no transmission permission is granted, learning ending determination (S163) is made, and if it is determined not to end (S163 NO), all the processings (S141 to S163) are repeated again. In contrast, if it is determined to end (S163 YES), the learning processing ends.

In contrast, if permission to transmit the cache table is granted (S159 YES), the data transmission processing unit 6122 performs processing of transmitting the second cache table that was encrypted by the encryption processing unit 6121, to the final server 5 (S161). This is followed by the learning ending determination (S163).

The learning processing operation in the final server 5 will now be explained.

Figure 24:
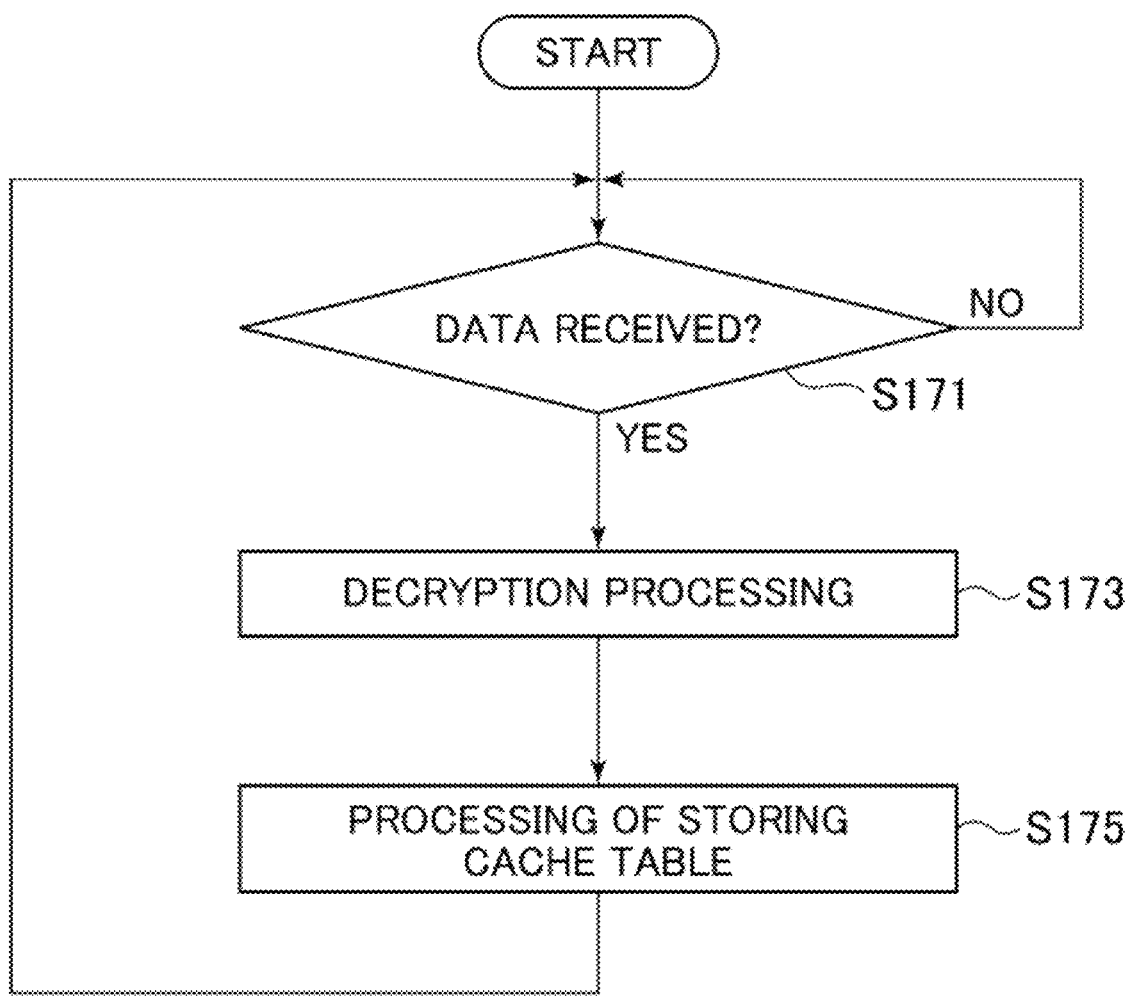
FIG. 24 is a storage processing in the final server (third embodiment).

FIG. 24 is a flowchart related to processing of reception and storage of the second cache table (X2-s2, Z2-s2) transmitted from the intermediate server 6. As is clear from the drawing, when the learning processing is started in the final server 5, the input data receiving unit 5115 goes into the data reception waiting mode (S171). If, in this state, the data corresponding to the encrypted second cache table is received (S171 YES), the data reception waiting mode is cleared, the received second cache data is decrypted with a private key or the like (S173), and processing of storing it in the storage unit is performed (S175). Upon completion of this storage processing, the final server 5 again goes into the reception waiting mode (S171 NO).

Figure 25:
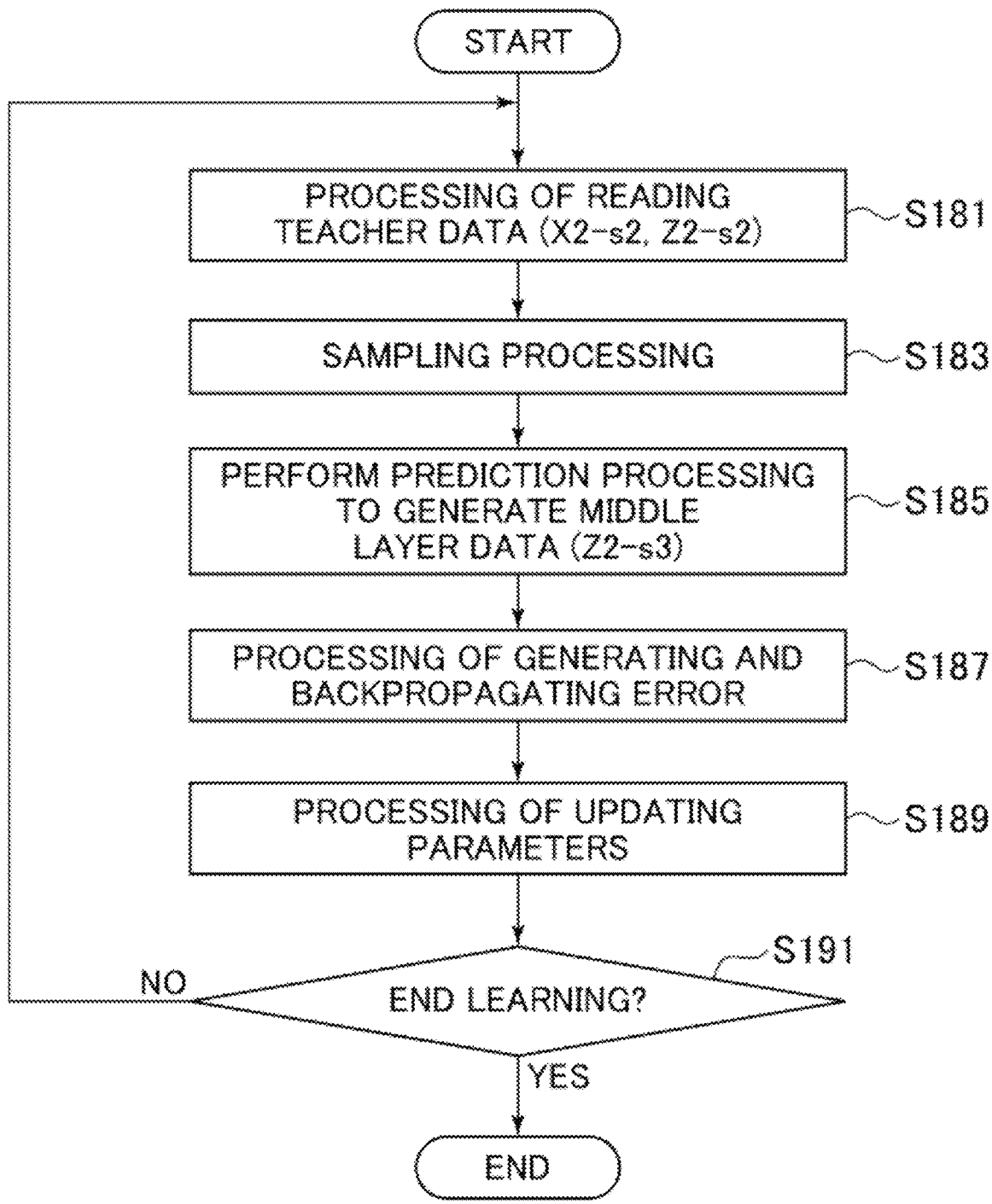
FIG. 25 is a learning process in the final server (third embodiment).

FIG. 25 is a flowchart related to the learning processing operation in the final server 5 executed concurrently with the processing of receiving the second cache table shown in FIG. 24. When the learning processing starts, the data reading unit 5110 performs processing of reading a cache table (S181). The sampling processing unit (55111) then extracts an input and output pair to be a learning target, from the cache table (S183).

The prediction processing unit 5112 performs prediction processing from the third middle layer to the fourth middle layer based on the read second input-side middle layer data (X2-s2), thereby generating the second output-side middle layer data (Z2-s3) (S185). The error backpropagation processing unit 5113 generates an error between the second output-side middle layer data (Z2-s3) and the teacher data (Z2-s2), and the error or a prescribed value (for example, root mean square error) based on the error is propagated from the output side to the input side by methods such as the steepest descent method (S187).

After that, the parameter update processing unit 5114 performs processing of updating the parameters such as weights of the learning model based on the back propagated error and the like (S189). If parameter updating processing is performed, learning ending determination is made, and if a prescribed end condition is not satisfied (S191 NO), the series of processing (S181 to S189) is performed again. In contrast, if the prescribed end condition is satisfied (S191 YES), the learning processing ends.

Figure 26:
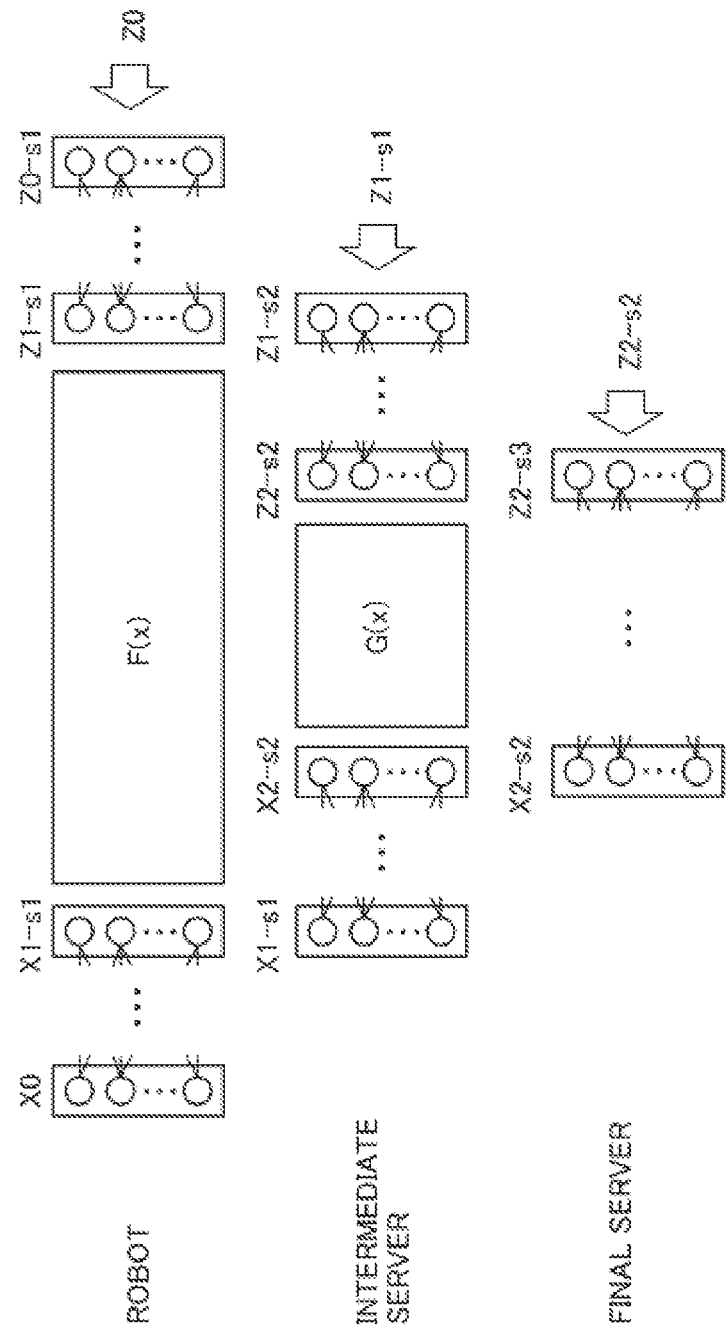
FIG. 26 is a conceptual diagram related to a learning process (third embodiment).

FIG. 26 is a conceptual diagram of the learning processing implemented with the system 30 according to this embodiment. In the drawing, the upper part is a conceptual diagram of the learning processing performed in the robot 7, the middle part is a conceptual diagram of the learning processing performed in the intermediate server 6, and the lower part is a conceptual diagram of the learning processing performed in the final server 5. The left side of the drawing shows the input side, and the right side shows the output side.

As is clear from the drawing, when the input information (X0) is input to the robot 7, the prediction processing unit 7117 performs prediction processing from the input stage to the first middle layer, thereby generating the first input-side middle layer data (X1-s1). Meanwhile, the approximation function generation processing unit 7116 generates an approximation function (F(x)) based on the first cache table (X1 and Z1). The prediction processing unit 7117 generates the first output-side middle layer data (Z1-s1) based on the first input-side middle layer data (X1-s1) and the approximation function (F(x)). Further, the final output data (Z0-s1) is generated based on the first output-side middle layer data (Z1-s1). The error backpropagation processing unit 7118 back propagates the error between the final output data (Z0-s1) and the teacher data (Z0) from the final output stage to the input stage via an approximation function. After that, the parameter update processing unit 7119 updates the parameters including the weights from the final output stage to the second middle layer, and from the first middle layer to the input stage. Further, the first cache table (X1-s1, Z1-s1) generated at this time is provided to the intermediate server 6 under prescribed conditions.

As is clear from the drawing, when the first input-side middle layer data (X1-s1) is input to the intermediate server 6, the prediction processing unit 6118 performs prediction processing from the first middle layer to the third middle layer, thereby generating the second input-side middle layer data (X2-s2). Meanwhile, the approximation function generation processing unit 6117 generates an approximation function (G(x)) based on the first cache table (X1-s1, Z1-s1). The prediction processing unit 6118 generates the second output-side middle layer data (Z2-s2) based on the second input-side middle layer data (X2-s2) and the approximation function (G(x)). Further, the first output-side middle layer data (Z1-s2) is generated based on the second output-side middle layer data (Z2-s2). The error backpropagation processing unit 6119 back propagates the error between the final output data (Z1-s2) and the teacher data (Z1-s1) from the second middle layer to the first middle layer via an approximation function. After that, the parameter update processing unit 6120 updates the parameters including the weights from the second middle layer to the fourth middle layer, and from the third middle layer to the first middle layer. Further, the second cache table (X2-s2, Z2-s2) generated at this time is provided to the final server 5 under prescribed conditions.

Moreover, as is clear from the drawing, when the second input-side middle layer data (X2-s2) is input to the final server 5, the prediction processing unit 5112 performs prediction processing from the third middle layer to the fourth middle layer, thereby generating the second output-side middle layer data (Z2-s3). The error backpropagation processing unit 5113 back propagates the error between the second output-side middle layer data (Z2-s3) and the teacher data (Z2-s2) from the fourth middle layer to the third middle layer. After that, the parameter update processing unit 5114 updates the parameters including the weights from the fourth middle layer to the fourth middle layer.

4. Modification

The present invention is not limited to the configuration and operation of the aforementioned embodiment, and can be modified in various ways.

In the third embodiment, the approximation function generated from the cache table is described as used only in learning processing. However, the present invention is not limited to such a configuration. For instance, an approximation function may be generated based on the cache table obtained so far for the purpose of prediction processing, and prediction processing may be performed for the section from the first middle layer extending to the second middle layer based on the first input-side middle layer data (X1) and approximation function, thereby generating the output-side middle layer data (Z1). With such a configuration, for example, after a certain amount of data is accumulated in the hash table, prediction processing can be performed without significantly reducing the frequency of inquiries to the server side or without making inquiries.

Figure 6:
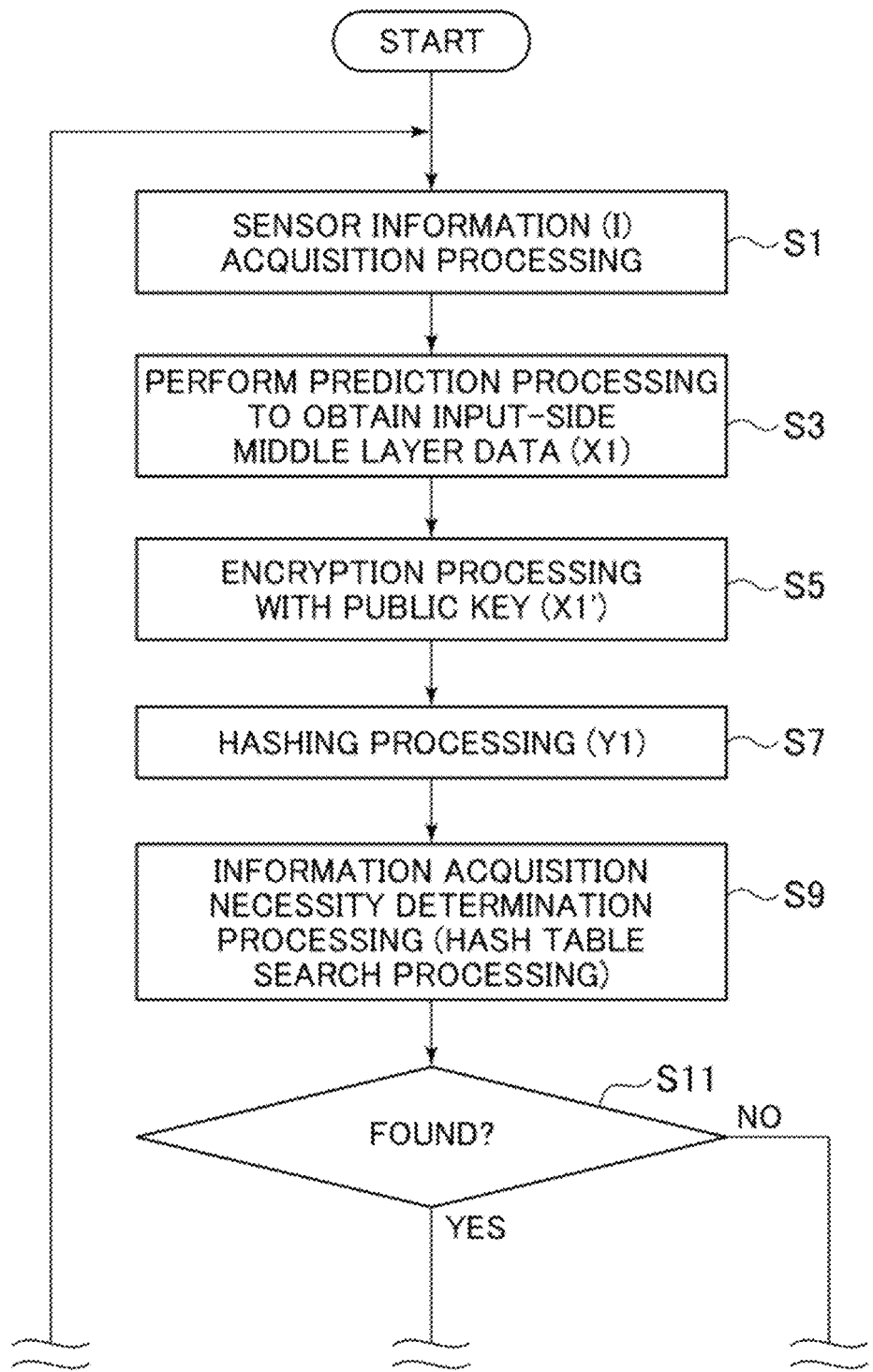
FIG. 6 is a prediction processing in the robot (first embodiment) (No. 1).
Figure 7:
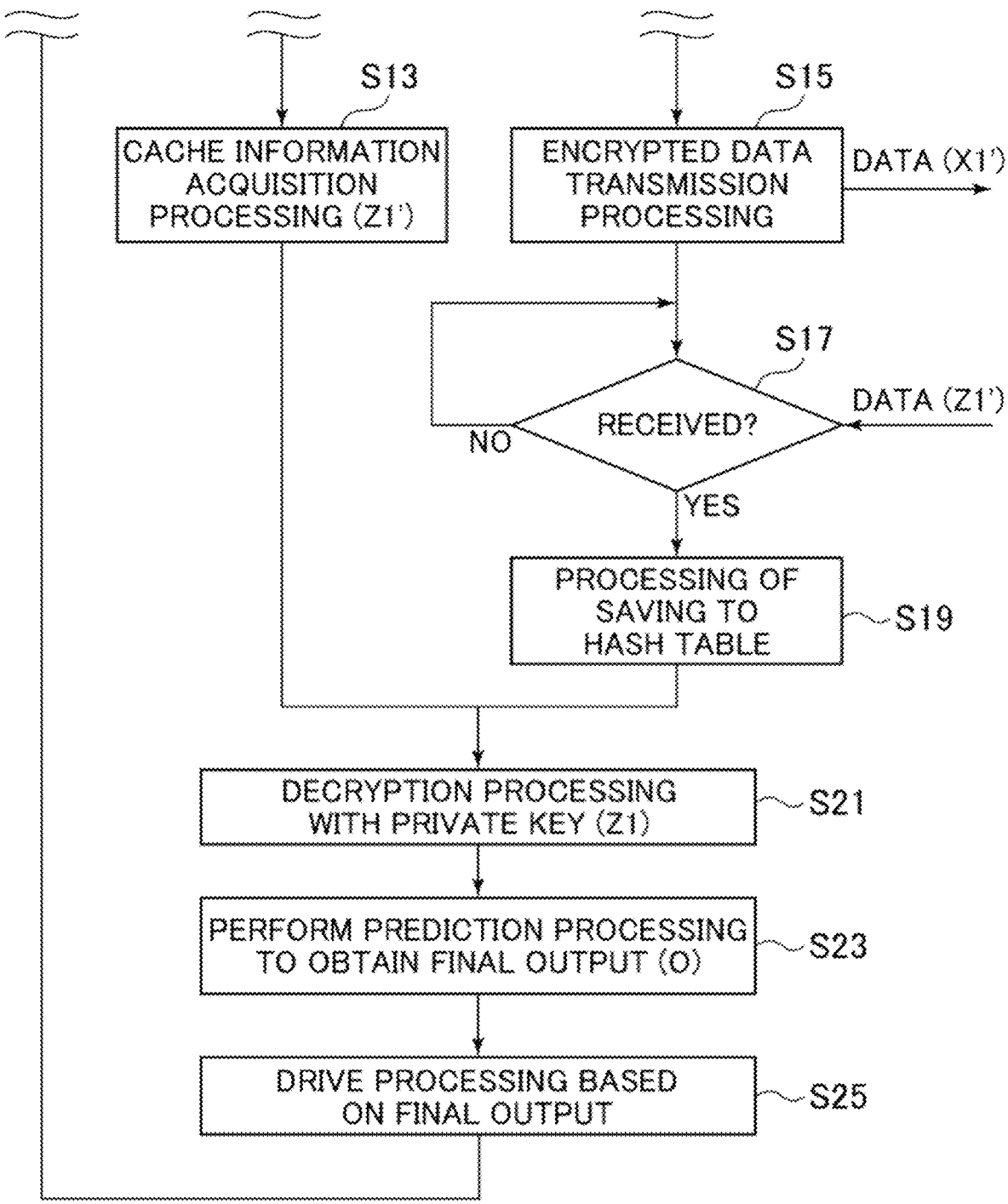
FIG. 7 is a prediction processing in the robot (first embodiment) (No. 2).

In the aforementioned embodiments, the input-side middle layer data (X) (for example, X1 or X2) is encrypted and hashed, and hash table search processing is then performed using the hash value as a key (for example, S11 in FIG. 6 and S55 in FIG. 13). However, the present invention is not limited to such a configuration. Therefore, for example, the input-side middle layer data (X) may be subjected to rounding processing, then encrypted and/or hashed, and searched from the hash table. Rounding processing is processing in which, where the group to which input-side middle layer data (X) belongs is U, specific input-side middle layer data belonging to the group U is regarded as having the equal value (X_u)) (representative value). For example, some node values (neuron firing values) of the input-side middle layer data (X) may be discretized into integer values by, for example, rounding up or down the numerical values, thereby forming a group of multiple integer values. With such a configuration, correspondence with the hash value that was obtained in the past can be improved, which leads to speedup of processing, for example.

Figure 27:
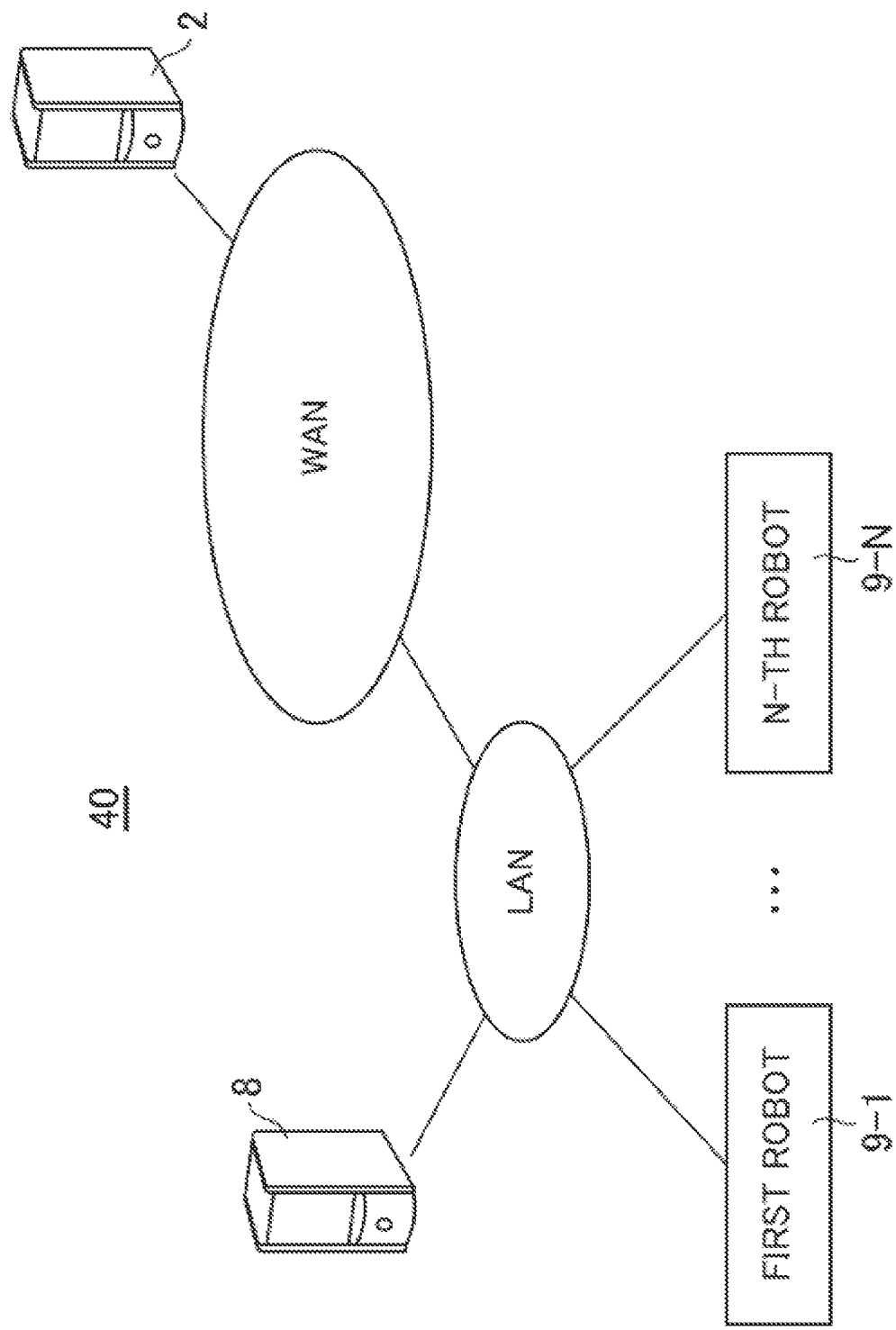
FIG. 27 is an overall configuration diagram of a system (modification).

In the aforementioned embodiments, the robot 7 as a client device is configured to directly communicate with the intermediate server 6 or the server 1. However, the present invention is not limited to such a configuration. FIG. 27 is an overall configuration diagram of a system 40 according to a Modification. In the configuration, the system 40 consists of a server 2 that performs prediction processing, an intermediary server 8 that is connected to the server 2 via a WAN and is connected to a LAN, and a robot 9 as a client device connected to the LAN. In this modification, information is exchanged between the server 2 and the client device 9 via the intermediary server 8.

In the aforementioned embodiments, supervised learning using a neural network (or deep learning) was illustrated as a machine learning algorithm. However, the present invention is not limited to such a configuration. Therefore, for example, other machine learning algorithms that are divisible and can handle intermediate values in a similar format may be used. Moreover, not only supervised learning but also unsupervised learning such as Generative Adversarial Networks (GAN), Variational Auto Encoder (VAE), and Self-Organizing Map (SOM), or reinforcement learning may be used. In the case where reinforcement learning is performed, for example, prediction processing or the like on a simulator may be used.

In the learning processing in the aforementioned embodiments, the approximation function is generated by approximation by the linear equation shown in Formula 5. However, the approximation method is not limited to such an example, and other methods may be used for the approximation.

Figure 28:
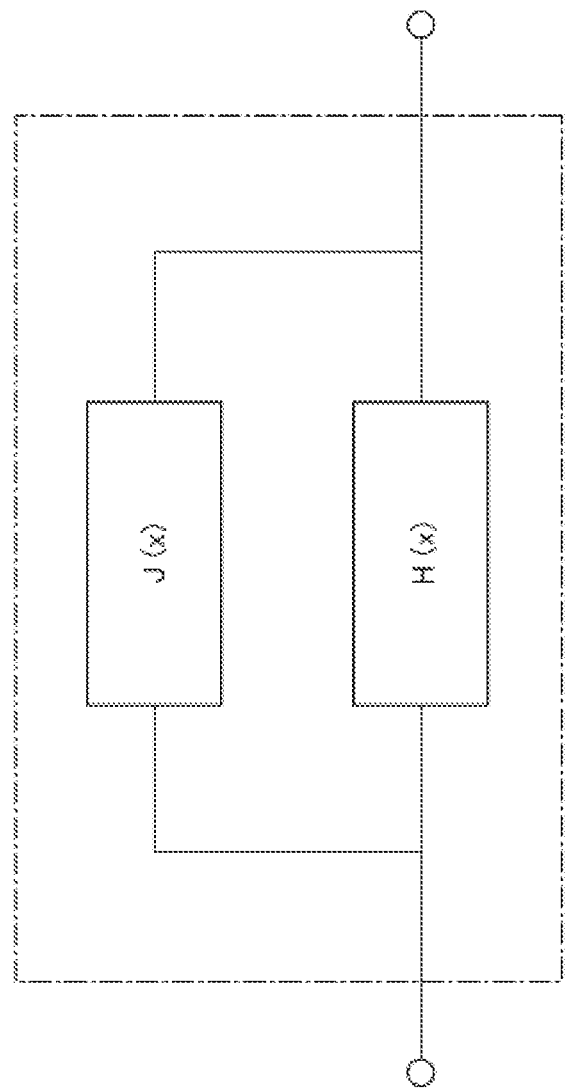
FIG. 28 is a conceptual diagram related to an example of use of a bypass function.

For instance, a bypass function may be used as the approximation function. FIG. 28 is a conceptual diagram related to an example of use of a bypass function. In the drawing, H(x) represents an approximation function based on the linear equation shown in Formula 5 or the like, and J(x) represents a bypass function, forming an approximation function as a whole. As is clear from the drawing, the bypass function J(x) is disposed in parallel so as to go around (bypass) the approximation function H(x) based on the linear equation. Note that the error backpropagation method can be applied to any functions.

Figure 29:
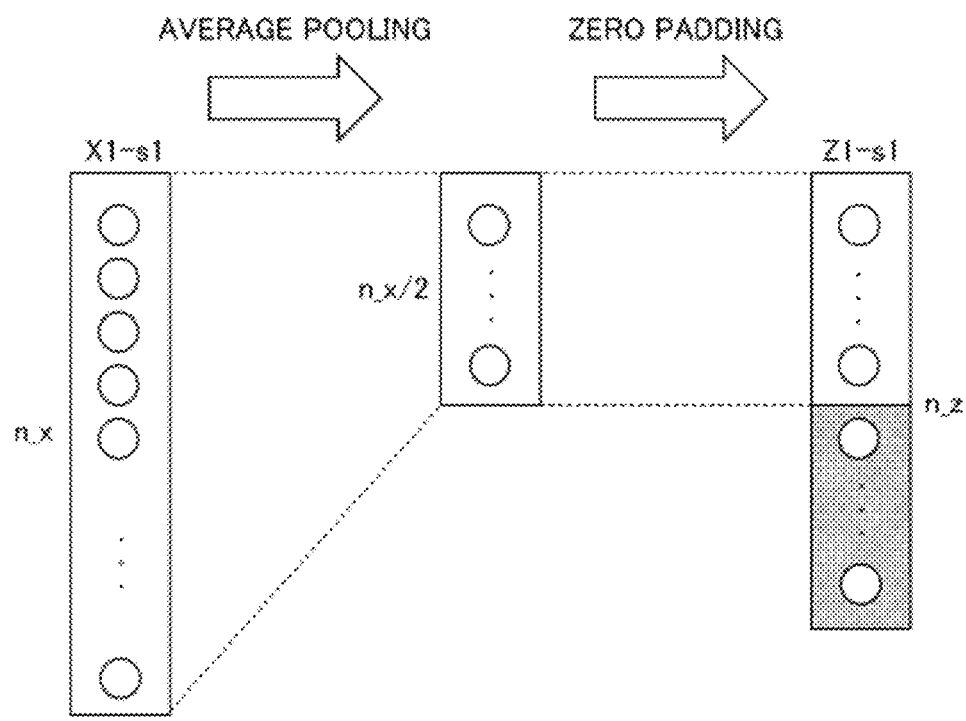
FIG. 29 is a conceptual diagram of a bypass function.

FIG. 29 is a conceptual diagram of a bypass function J(x). In the example shown in the drawing, a case is shown where the number of nodes in the input-side middle layer is larger than the number of nodes in the output-side middle layer. When data is input from the input-side middle layer, the bypass function J(x) compresses the data using a pooling layer having less nodes (for example, about half the number of nodes in the input-side middle layer). The node output of the pooling layer is then provided to the output-side middle layer. Here, zero (0) is provided to the nodes through which no connection is established from the pooling layer to the output-side middle layer (zero padding).

For instance, when the number of nodes n_x in the input-side middle layer is 32 and the number of nodes n_z in the output-side middle layer is 20, the number of nodes in the pooling layer is 16 which is half of the number of nodes n_x in the input-side middle layer. Here, the pooling method may be average pooling or the like that takes the average of the adjacent node values. The 16 outputs from the pooling layer are then provided to the output-side middle layer. Here, zero (0) is provided to the four output-side middle layer nodes that are not associated with pooling layer nodes. Although the pooling layer is used in this modification, the pooling layer should not necessarily be used: for instance, a bypass route that allows data to directly pass may be formed.

With such a configuration, error backpropagation is promoted by bypassing the approximation function generated based on the cache table, and as a result, learning efficiency can be increased.

Figure 30:
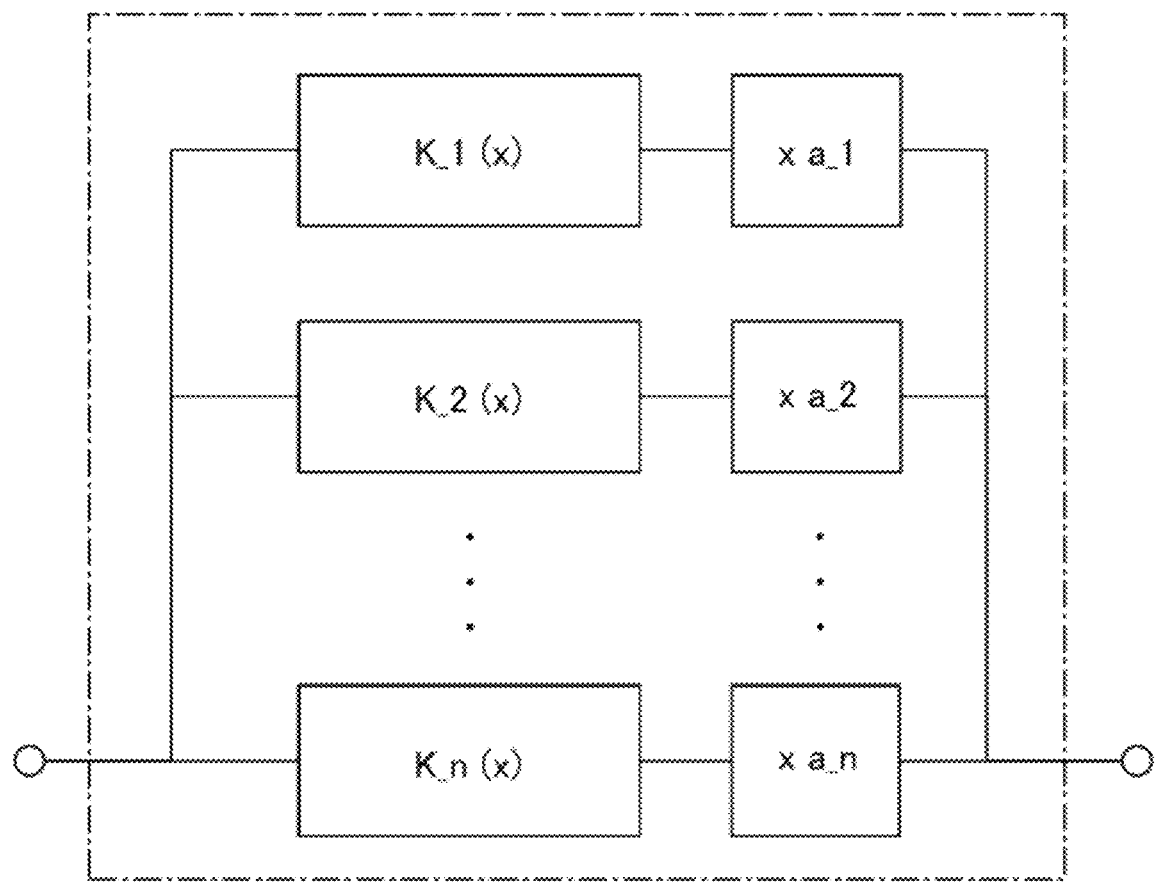
FIG. 30 is a conceptual diagram of approximation using a subapproximation function.

Also, for example, the sum of multiple subapproximation functions may be used as the approximation function. FIG. 30 is a conceptual diagram of approximation using the sum of subapproximation functions. As is clear from the drawing, the output of the approximation function is the total sum of the values (weighted sum) obtained by multiplying multiple different approximation functions K_1(x), K_2(x), K_3(x), . . . K_n(x) (these functions will hereinafter be referred to as subapproximation functions for convenience) by the contribution coefficients a_1, a_2, a_3, . . . a_n, respectively. Here, each of the contribution coefficients a_i (i=1, 2, . . . N) is a value of 0 or more and 1 or less, and the total sum of a_i is 1, that is, a_1+a_2+ . . . +a_n=1. This contribution coefficient may be a fixed value, or may be varied in such a manner that a different value is given in each forward calculation or error backpropagation. Each subapproximation function is, for example, an approximation function generated based on a cache table or an approximation function based on a linear equation used in a neural network or the aforementioned embodiments. All subapproximation functions are configured such that the error backpropagation method can be applied.

With such a configuration, the approximation accuracy is expected to be improved by the ensemble effect with the layers before and after the approximation function, whereby even if data accumulated in the cache table is inadequate, the approximation accuracy can be expected to be maintained or to improve.

In the aforementioned embodiments, the robots, intermediate servers, final servers, and the like were all illustrated as single devices. However, the present invention is not limited to such a configuration. Therefore, for example, a part of a device configuration may be separately provided as an external device. For instance, an external large-capacity storage may be installed and connected to a server or other devices. Alternatively, instead of a single device, multiple devices may be used for distributed processing or the like. Alternatively, virtualization technology or the like may be used.

Although one client device holds one hash table in the aforementioned embodiments, the present invention is not limited to such a configuration. Therefore, the hash table may be shared among multiple client devices, for example. Consequently, the cache of the prediction processing performed in each client device is accumulated to be shared, thereby more rapidly reducing the server usage cost, increasing the processing speed, and allowing the client devices to operate autonomously, and the like. Note that the hash table may be shared, for example, using the intermediary server 8 in the system shown in FIG. 27, or using a distributed hash table or other techniques to allow each of the client devices to directly obtain information from each other without a server or the like.

Although an example in which learning processing is sequentially performed is shown in the aforementioned embodiments, the present invention is not limited to such a configuration. Therefore, for example, a configuration can be such that the parameters are updated in batch after accumulation of a certain amount of errors corresponding to multiple input and output pairs. Alternatively, so-called online learning in which learning processing is performed concurrently with prediction processing may be performed.

In the aforementioned embodiments, robots were illustrated as the client devices. However, the present invention is not limited to such a configuration. The client devices should be construed as including any devices with or without physical operation. Note that examples of the client devices include all information processing devices such as smartphones, tablet terminals, personal computers, smart speakers, and wearable terminals.

Although robot operation information (sensor signals or motor signals) are expressed as learning targets in the aforementioned embodiments, the present invention is not limited to such a configuration. Therefore, for example, learning target data may include all kinds of information such as imaging signals, voice signals, image signals, video signals, language information, and character information, and may undergo processing for various purposes such as voice recognition processing, image signal processing, and natural language processing.

Although the client devices are configured to cause the server side to perform arithmetic operations between the input-side middle layer (X) and the output-side middle layer (Z) in the aforementioned embodiments, the present invention is not limited to such a configuration. Therefore, for example, client devices may also perform prediction processing by holding a part of a prescribed divided middle layer, and transmitting and receiving a part of the prediction results to and from the server more than once.

In the aforementioned embodiments, processing of updating parameters such as weights for portions of learning models excluding approximation functions based on the error back propagated by the error backpropagation method is performed (for example, S115 and S157). However, the present invention is not limited to such a configuration. Therefore, for example, processing of updating the parameters in the approximation functions may also be performed.

INDUSTRIAL APPLICABILITY

The present invention is available in any industries that utilize machine learning technology.

REFERENCE SIGNS LIST

1 Server
3 Robot
5 Final server
6 Intermediate server
7 Robot
8 Intermediary server
10 System

The invention claimed is:

1. A client device comprising:
an input-side conversion processing unit that is a part of the trained model extending from an input layer to a first middle layer of the trained model, and performs conversion processing based on the input data to generate a first intermediate output of the first middle layer of the trained model;
a client-side transmitting unit that transmits the first intermediate output to a server;
a client-side receiving unit that receives a second intermediate output from the server, the second intermediate output being generated in the server based on the first intermediate output and being a conversion output of a second middle layer, the second middle layer closer to the second intermediate output than the first middle layer of the trained model;
an output-side conversion processing unit that is a part of the trained model extending from the second middle layer to an output layer of the trained model, and performs conversion processing based on the second intermediate output to generate the output data;
a cache table storage unit that stores a cache table showing correspondence between the first intermediate output and the second intermediate output;
a determination unit that determines whether or not the second intermediate output corresponding to the first intermediate output exists in the cache table; and
a selective acquisition unit that, when the determination unit determines that the second intermediate output corresponding to the first intermediate output exists in the cache table, acquires the corresponding second intermediate output from the cache table instead of operating the client-side transmitting unit and the client-side receiving unit, and when the determination unit determines that the second intermediate output corresponding to the first intermediate output is absent from the cache table, operates the client-side transmitting unit and the client-side receiving unit to acquire the second intermediate output received at the client-side receiving unit;
an encryption unit that encrypts the first intermediate output and generates a first encrypted intermediate output;
a decryption unit that decrypts a second encrypted intermediate output that is a second intermediate output encrypted in the server;
wherein the client-side transmitting unit transmits the first encrypted intermediate output to the server,
wherein the server decrypts the received first encrypted intermediate output to restore the first intermediate output, encrypts the second intermediate output to generate the second encrypted intermediate output, and transmits the second encrypted intermediate output to the client device, and
wherein the client-side receiving unit receives the second encrypted intermediate output;
a hashing processing unit that hashes the first encrypted intermediate output and generates a first hash value;
wherein the first intermediate output in the cache table is the first hash value, and
wherein the determination unit determines whether or not the corresponding second intermediate output exists, based on the first hash value.

2. A conversion system that comprises:
a server;
a network; and
at least one client device of claim 1;
wherein the server is connected to the client device via the network, and generates output data by performing conversion processing on input data based on a trained model obtained by machine learning.

3. The conversion system according to claim 2, wherein the client device further comprises a cache table storage unit that associates the second intermediate output received at the client-side receiving unit with the corresponding first intermediate output, and stores the second intermediate output to the cache table.

4. The conversion system according to claim 2, wherein the client device further comprises a value rounding processing unit that performs rounding processing of the first intermediate output to generate a first rounded intermediate output.

5. The conversion system according to claim 2, wherein the client device further comprises:
an approximation function generating unit that generates an approximation function, based on the cache table; and
an approximation conversion processing unit that generates the second intermediate output based on the approximation function that uses the first intermediate output as an input.

6. The conversion system according to claim 5, wherein the approximation function is a function to which a backpropagation method can be applied.

7. The conversion system according to claim 5, wherein the approximation function includes a bypass function.

8. The conversion system according to claim 5, wherein the approximation function consists of a weighted sum of multiple different approximation functions.

9. The conversion system according to claim 2, wherein the at least one client device comprises a plurality of client devices, and the cache table is shared by the plurality of client devices.

10. The conversion system according to claim 2, wherein the server further comprises an intermediate conversion processing unit that is a part of the trained model extending from the first middle layer to the second middle layer, and performs conversion processing based on the first intermediate output to generate the second intermediate output of the second middle layer.

11. The conversion system according to claim 2, wherein the server comprises servers in multiple layers connected via a network, and each server respectively holds a partial model divided from the trained model between the first middle layer and the second middle layer so that conversion processing is performed in sequence based on the partial model of each server to generate the second intermediate output.

12. The conversion system according to claim 2, wherein the client device further comprises an input and output data table storage unit that stores an input and output data table showing a relationship between the input data and the output data corresponding to the input data.

13. A conversion method that is performed in a client device connected with a server via a network, and generates output data by performing conversion processing on input data based on a trained model obtained by machine learning, the method comprising:
   an input-side conversion processing step of using a part of the trained model extending from an input layer to a first middle layer of the trained model to perform conversion processing based on the input data to generate a first intermediate output of the first middle layer of the trained model;
   a client-side transmitting step of transmitting the first intermediate output to the server;
   a client-side receiving step of receiving a second intermediate output from the server, the second intermediate output being generated in the server from the first intermediate output and being a conversion output of the second middle layer closer to the output side than the first middle layer of the trained model;
   an output-side conversion processing step of using a part of the trained model extending from the second middle layer to an output layer of the trained model to perform conversion processing based on the second intermediate output to generate the output data;
   a cache table storage step of storing a cache table showing correspondence between the first intermediate output and the second intermediate output;
   a determination step of determining whether or not the second intermediate output corresponding to the first intermediate output exists in the cache table; and
   a selective acquisition step of, when the determination step determines that the second intermediate output corresponding to the first intermediate output exists in the cache table, acquiring the corresponding second intermediate output from the cache table instead of performing the client-side transmitting step and the client-side receiving step, and when the determination step determines that the second intermediate output corresponding to the first intermediate output is absent from the cache table, performing the client-side transmitting step and the client-side receiving step to acquire the second intermediate output received in the client-side receiving step;
   an encryption step of encrypting the first intermediate output and generating a first encrypted intermediate output;
   a decryption step of decrypting a second encrypted intermediate output that is a second intermediate output encrypted in the server;
   wherein the first encrypted intermediate output is transmitted to the server,
   wherein the received first encrypted intermediate output is decrypted to restore the first intermediate output, the second intermediate output is encrypted to generate the second encrypted intermediate output, and the second encrypted intermediate output is transmitted to the client device, and
   wherein the second encrypted intermediate output is received by the client device,
   a hashing processing step of hashing the first encrypted intermediate output and generating a first hash value;
   wherein the first intermediate output in the cache table is the first hash value, and
   wherein whether or not the corresponding second intermediate output exists is determined based on the first hash value.

14. A non-transitory computer readable medium having instructions stored thereon to cause a processor of a client device that is connected to a server via a network, and generates output data to perform operations comprising:
   an input-side conversion processing step of using a part of the trained model extending from an input layer to a first middle layer of the trained model to perform conversion processing based on the input data to generate a first intermediate output of the first middle layer of the trained model;
   a client-side transmitting step of transmitting the first intermediate output to the server;
   a client-side receiving step of receiving a second intermediate output from the server, the second intermediate output being generated in the server based on the first intermediate output and being a conversion output of the second middle layer closer to the output side than the first middle layer of the trained model;
   an output-side conversion processing step that is a part of the trained model extending from the second middle layer to an output layer of the trained model to perform conversion processing based on the second intermediate output to generate the output data;
   a cache table storage step of storing a cache table showing correspondence between the first intermediate output and the second intermediate output;
   a determination step of determining whether or not the second intermediate output corresponding to the first intermediate output exists in the cache table; and
   a selective acquisition step of, when the determination step determines that the second intermediate output corresponding to the first intermediate output exists in the cache table, acquiring the corresponding second intermediate output from the cache table instead of performing the client-side transmitting step and the client-side receiving step, and when the determination step determines that the second intermediate output corresponding to the first intermediate output is absent from the cache table, performing the client-side transmitting step and the client-side receiving step to acquire the second intermediate output received in the client-side receiving step;
   an encryption step of encrypting the first intermediate output and generating a first encrypted intermediate output;
   a decryption step of decrypting a second encrypted intermediate output that is a second intermediate output encrypted in the server;
   wherein the first encrypted intermediate output is transmitted to the server,
   wherein the received first encrypted intermediate output is decrypted to restore the first intermediate output, the second intermediate output is encrypted to generate the second encrypted intermediate output, and the second encrypted intermediate output is transmitted to the client device, and
   wherein the second encrypted intermediate output is received by the client device, a hashing processing step of hashing the first encrypted intermediate output and generating a first hash value;

wherein the first intermediate output in the cache table is the first hash value, and wherein whether or not the corresponding second intermediate output exists is determined based on the first hash value.

15. A client device comprising:

an input-side conversion processing unit that is a part of the machine learning model extending from an input layer to a first middle layer of the machine learning model, and performs conversion processing based on the input data supplied to the machine learning model to generate a first intermediate output of the first middle layer of the machine learning model;

an output-side conversion processing unit that is a part of the machine learning model extending from the second middle layer closer to the output side than the first middle layer to an output layer, and performs conversion processing based on an input to the second middle layer to generate the output data of the machine learning model; and an intermediate conversion processing unit that performs conversion processing based on an approximation function generated based on sample information showing correspondence relationship between the first intermediate output and the second intermediate output of the machine learning model, and generates the second intermediate output based on the first intermediate output, wherein the output data is generated by operating the input-side conversion processing unit, the intermediate conversion processing unit, and the output-side conversion processing unit, using the input data as an input to the input-side conversion processing unit, a client-side transmitting unit that transmits the first intermediate output to the server;

a client-side receiving unit that receives a second intermediate output from the server, the second intermediate output being generated in the server from the first intermediate output and being a conversion output of a second middle layer, the second middle layer closer the second intermediate output than the first middle layer of the trained model;

a cache table storage unit that stores a cache table showing correspondence between the first intermediate output and the second intermediate output;

a determination unit that determines whether or not the second intermediate output corresponding to the first intermediate output exists in the cache table;

a selective acquisition unit that, when the determination unit determines that the second intermediate output corresponding to the first intermediate output exists in the cache table, acquires the corresponding second intermediate output from the cache table instead of operating the client-side transmitting unit and the client-side receiving unit, and when the determination unit determines that the second intermediate output corresponding to the first intermediate output is absent from the cache table, operates the client-side transmitting unit and the client-side receiving unit to acquire the second intermediate output received at the client-side receiving unit, and the sample information is the cache table;

an encryption unit that encrypts the first intermediate output and generates a first encrypted intermediate output;

a decryption unit that decrypts a second encrypted intermediate output that is a second intermediate output encrypted in the server;

wherein the client-side transmitting unit transmits the first encrypted intermediate output to the server, wherein the server decrypts the received first encrypted intermediate output to restore the first intermediate output, encrypts the second intermediate output to generate the second encrypted intermediate output, and transmits the second encrypted intermediate output to the client device, and wherein the client-side receiving unit receives the second encrypted intermediate output;

a hashing processing unit that hashes the first encrypted intermediate output and generates a first hash value;

wherein the first intermediate output in the cache table is the first hash value, and wherein the determination unit determines whether or not the corresponding second intermediate output exists, based on the first hash value.

* * * * *